United States Patent
Livingston et al.

(10) Patent No.: US 8,477,147 B2
(45) Date of Patent: Jul. 2, 2013

(54) METHODS AND SYSTEMS OF COMPARING FACE MODELS FOR RECOGNITION

(75) Inventors: Mark Alan Livingston, Alexandria, VA (US); Justin M. Solomon, Oakton, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 917 days.

(21) Appl. No.: 12/416,716

(22) Filed: Apr. 1, 2009

(65) Prior Publication Data

US 2009/0244082 A1    Oct. 1, 2009

Related U.S. Application Data

(60) Provisional application No. 61/041,305, filed on Apr. 1, 2008.

(51) Int. Cl.
   *G09G 5/00*    (2006.01)
(52) U.S. Cl.
   USPC ........................................................ 345/581
(58) Field of Classification Search
   USPC ........................................................ 345/581
   See application file for complete search history.

(56) References Cited

U.S. PATENT DOCUMENTS

| | | | |
|---|---|---|---|
| 6,356,659 B1* | 3/2002 | Wiskott et al. | 382/209 |
| 6,463,176 B1* | 10/2002 | Matsugu et al. | 382/195 |
| 2003/0108223 A1* | 6/2003 | Prokoski | 382/115 |
| 2003/0123713 A1* | 7/2003 | Geng | 382/118 |
| 2006/0017739 A1* | 1/2006 | Fang et al. | 345/582 |
| 2007/0127787 A1* | 6/2007 | Castleman et al. | 382/118 |
| 2009/0028442 A1* | 1/2009 | Kimmel et al. | 382/218 |

OTHER PUBLICATIONS

Hormann et al.; "Mesh Parameterization: Theory and Practice;" ACM SIGGRAPH '07; ACM, New York, NY; Aug. 2007.*
Justin Solomon; "Fast and Accurate Estimation of Principal Curvatures and Directions for Morphable Models" Stanford University, Stanford, CA; Sep. 2007.*
Theisel et al. "Normal Based Estimation of the Curvature Tensor for Triangular Meshes;" Proceedings of the 12th Pacific Conference on Computer Graphics and Applications (PG'04); Oct. 2004; IEEE, New York, NY, pp. 288-297.*
Pae et al.; "On Computing Structural Changes in Evolving Surfaces and their Appearance;" International Journal of Computer Vision, vol. 43, issue 2, pp. 113-131, Kluwer Academic Publishers, Jul. 2001.*

* cited by examiner

*Primary Examiner* — Edward Martello
(74) *Attorney, Agent, or Firm* — Amy L. Ressing; John L. Young

(57) ABSTRACT

Methods and systems of representation and manipulation of surfaces with perceptual geometric features, using a computer graphics rendering system, include executing algorithmic instructions to compute a plurality of vertices, edges and surfaces in a mesh for the purpose of defining representations of surfaces on grids. Normals and distances are determined for triangular surfaces to be considered. Additionally, height fields of a function are defined. A set of feature curves and a set of feature points are determined, based on the defined function. Infinitesimal movements along the representations of the surfaces are determined, along with determinations of properties of representations of continuous surfaces. Additional determinations of perceptual geometric features include determinations such as zero crossings, parabolic curves, flecnodes, ruffles, gutterpoints, conical points and biflecnodes in a given mesh. After these determinations are made, visual representations are rendered which capture perceptually important features for smoothly varying shapes.

14 Claims, 37 Drawing Sheets

BEAKS EVENT 1704

METHODS AND SYSTEMS OF COMPARING FACE MODELS FOR RECOGNITION

RELATED APPLICATIONS

The instant U.S. Patent Application claims the benefit of domestic priority from and is related to U.S. Provisional Patent Application No. 61/041,305; METHOD OF COMPARING FACE MODELS FOR RECOGNITION; filed on Apr. 1, 2008; whose inventors include Mark Alan Livingston and Justin Moor Solomon; where said U.S. Provisional Patent Application is herein incorporated by reference in its entirety.

FIELD OF THE INVENTION

The present disclosure is generally related to applications in computer graphics, including scientific data, medical images, humanoid forms, and geometric terrain models. In particular, the present disclosure has applications in computer implemented systems and methods of recognizing certain perceptual geometric features having geometric significance, extracting these features and demonstrating their utility in visualizing natural shapes, such as determining whether or not a human face matches an entry in a database of faces.

BACKGROUND OF THE INVENTION

The rendering of smoothly varying shapes, such as terrain or human forms, has been an area of interest for a number of fields, such as cartography, medical imaging, and scientific visualization. Similarly, the representation of smoothly curved surfaces is an important technology in fields such as CAD/CAM or modeling of humanoid figures. Another large field which requires representation of natural shapes is terrain appreciation, which in turn has a number of commercial, consumer, and military applications. The ability to visualize the implications of terrain for a particular application, such as the steepness of a slope, the available lines of sight from a point, and the relationship of subsurface structure to the surface structure are just a few tasks that are useful in a variety of fields.

Most geospatial information systems (GIS) provide a straightforward rendering of terrain based on linear facets, typically triangles. These representations suffer from several problems; in this work, we shall be concerned with two correlated issues: the density of the visual representation and the storage required to hold this representation. One goal of this disclosure is to show whether a minimal set of features may be extracted from terrain that properly conveys to the viewer an understanding of the geometric shape of the rendered terrain. The features used in the visualizations in this work derive from basic properties in differential geometry. Exemplary embodiments show methods for finding such features on terrain, where perceptual features are presented for continuous and sampled terrain models.

The human visual system uses (among other cues) the interior and exterior silhouettes of a static object or changes in the silhouettes of a moving object to understand its shape. Psychophysical and machine vision research have established patterns of perceptual properties for intrinsic geometric shapes (e.g. certain curves and points, regardless of color or reflectance), when they cross the silhouette boundary. For example, as a viewer circles around two hills, an apparent valley appears and disappears as one peak occludes the other, with the T junction at the termination of the silhouette revealing the two hills and their relative size and location. The curvature of the silhouettes indicates the steepness of the two hills. In general, geometric variations give rise to identifiable events such as changes in the silhouette, self occlusion, and self shadows. These events lead the human visual system to understand shape. Current visual representations do not use this information; the demonstrable fact that the human visual system does use these local surface features argues that the field would benefit from explicitly representing perceptually significant features, such as the ability to identify changes in the silhouette, self occlusion, and self shadows.

One particular area of interest in the question of understanding the impact of shapes is terrain. The shape of terrain determines watershed boundaries and drainage patterns, helps predict directions for avalanche or lava flows, and assists with identification of areas for building or farming. In the military and homeland security domain, the steepness of terrain determines the ease with which it may be defended and with which troops may move supplies to or through a particular location. One application of terrain analysis is to be able to identify lines of sight between specific points, maximize the surface area that is visible to a set of defenders, or (inversely) plan a path to avoid detection. Another important aspect of mission planning is to be able to identify ridges, troughs and/or valleys in the terrain structure in order that they may be used as unambiguous features.

Surface curvature has been used to develop good visualizations in a number of ways. Visual attention may be guided to or away from regions of a surface by systematically altering the curvature. Curvature plays an important role in distorting the reflection that a specular surface transmits; thus analysis of the distorted image can convey information about the surface curvature. Suggestive contours may be computed from radial curvatures and convey richer surface detail than true contours, albeit in a viewpoint-dependent fashion. Orienting texture along principal directions has been demonstrated to convey the 3D shape of otherwise transparent surfaces. Similarly, ridge, trough and/or valley lines have been shown to be important for understanding the shape of a surface.

Underlying many of these issues is the issues of how terrain may be represented. There are competing issues of accuracy, storage space, and processing time to consider. Given the capability of sensors to acquire great amounts of data, compression of a terrain representation down to just the features necessary to solve a particular issue is a useful aspect of a representation. ODETLAP (Overdetermined Laplacian Partial Differential Equations) uses a set of points to reconstruct an elevation matrix over a domain. One classic representation is the Triangulated Irregular Network (TIN) which uses linear facets between sample points. Another traditional method is the Digital Elevation Models (DEM), which specifies a raster grid of height samples; these are often interpolated with linear facets, but in theory could use higher order methods. Similar issues arise in representing more general 3D models.

Medical images are frequently displayed with either volume rendering or a surface extraction technique such as Marching Cubes and similar techniques. The former technique avoids an explicit surface representation, but requires a viewpoint dependent sampling of the volume to render an image. While various pre-processing strategies may reduce the computational load, either re-sampling or a reduction to view independent cells (usually linear) is required for rendering. The latter suffers from artifacts that disrupt the smoothness of the located surface, although such aliasing may be reduced through a relaxation process guided by the mean curvature flow. This solution, however, can introduce residual artifacts in areas of high curvature.

The need exists for the ability to explicitly represent perceptually significant geometric features, such as the ability to identify changes in the silhouette, self occlusion, and self shadows.

The need exists for computer implemented systems and methods providing the ability to eliminate or reduce the introduction of residual artifacts in areas of high curvature, when either re-sampling shapes or reduction to view of various shapes are required for rendering.

Further, the need exists for algorithms which demonstrate that such perceptual geometric features are effective in conveying the shape of a surface, as well as being effective in allowing other items to be visualized.

The need exists for an expansion of the use of perceptual geometric features to provide a more complete visual and geometric representation of a surface for which no a priori shape cues (such as the surface of human anatomy) are available.

Thus, the need exists for embodiments which provide visual representations that capture perceptually important geometric features for smoothly varying shapes.

The need exists for automated computer implemented systems and methods using algorithms for determining whether a minimal set of perceptual geometric features may be extracted from terrain that properly conveys to the viewer an understanding of the geometric shape of the rendered terrain.

Further, the need exists for methods of finding such perceptual geometric features on terrain where such perceptual geometric features will be presented for continuous and sampled terrain models.

SUMMARY OF THE INVENTION

Methods and systems of representation and manipulation of surfaces with perceptual geometric features using a computer processor implemented in a computer graphics rendering system, include receiving a request from a user to perform operations of visualization of surfaces. The computer processor initializes graphics algorithms along with instructions which when executed by the computer processor cause the computer processor to describe geometric models with a first group and/or plurality of geometric surface features significant to a human visual system. Additionally, the methods and systems detect a second group and/or set of geometric surface features in a second group of existing geometric models comparable to the first set of geometric surface features. The first group of geometric surface features includes psychophysics geometric surface feature models. The methods and systems compare the first group of geometric surface features, which are significant to the human visual system, with the second group of geometric surface features, where comparing includes analyzing perceptual geometric features by considering the group of psychophysics feature models favoring the human visual system. The computer processor executing the graphics algorithms causes filling in features between the first group of geometric surface features and the second group of geometric features and determining shape transformation, shape matching, erosion modeling and morphing, using a model matching algorithm to create either a partial model or create a full and/or entire model of new features. The computer processor executing the model matching algorithm renders comparisons of geometric surface features of the plurality of existing psychophysics feature models and perceptual geometric features and either the partial model and/or the entire model of new features. The results of analyzing, determining and rendering of feature models are applied to tasks in which shapes or spatial relations must be analyzed, recognized and understood. The model matching algorithm can be either a face matching algorithm or a terrain matching algorithm.

DETAILED DESCRIPTION OF THE INVENTION

Figure 1A:
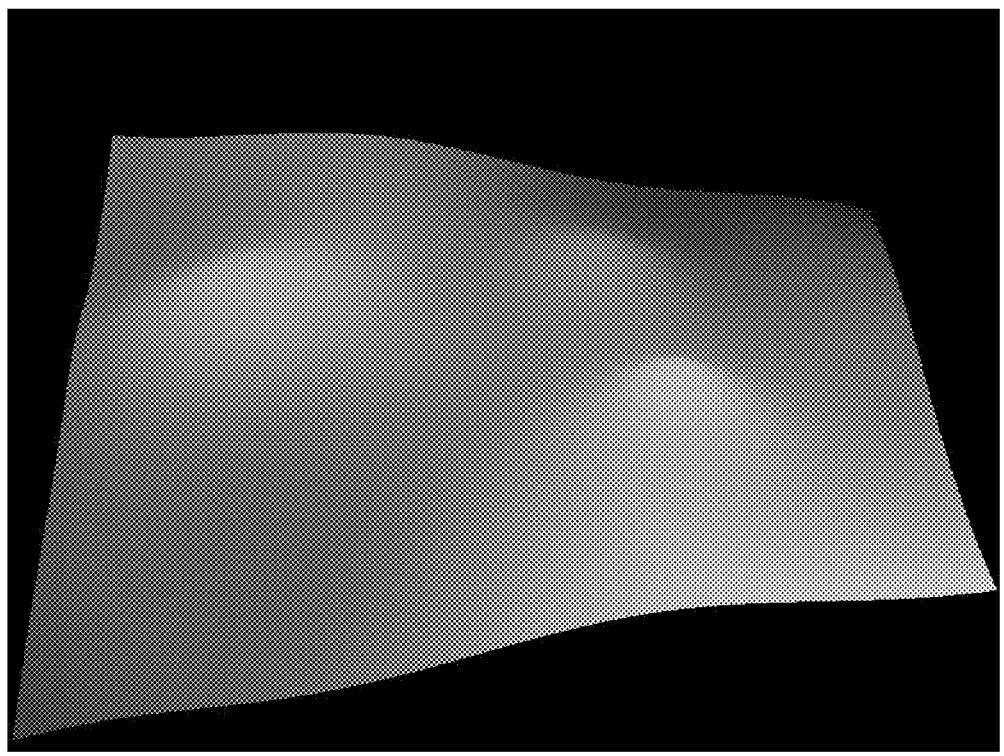
FIG. 1A illustrates terrain visualization, in which the terrain is shaded according to height.

Preferred exemplary embodiments of the present disclosure are now described with reference to the figures, in which like reference numerals are generally used to indicate identical or functionally similar elements. While specific details of the preferred exemplary embodiments are discussed, it should be understood that this is done for illustrative purposes only. A person skilled in the relevant art will recognize that other configurations and arrangements can be used without departing from the spirit and scope of the preferred exemplary embodiments. It will also be apparent to a person skilled in the relevant art that this invention can also be employed in other applications. System components, described in the exemplary embodiments can be off the shell commercially available devices or specially made devices. Further, the terms "a", "an", "first", "second" and "third" etc. used herein do not denote limitations of quantity, but rather denote the presence of one or more of the referenced items(s).

Figure 10A:
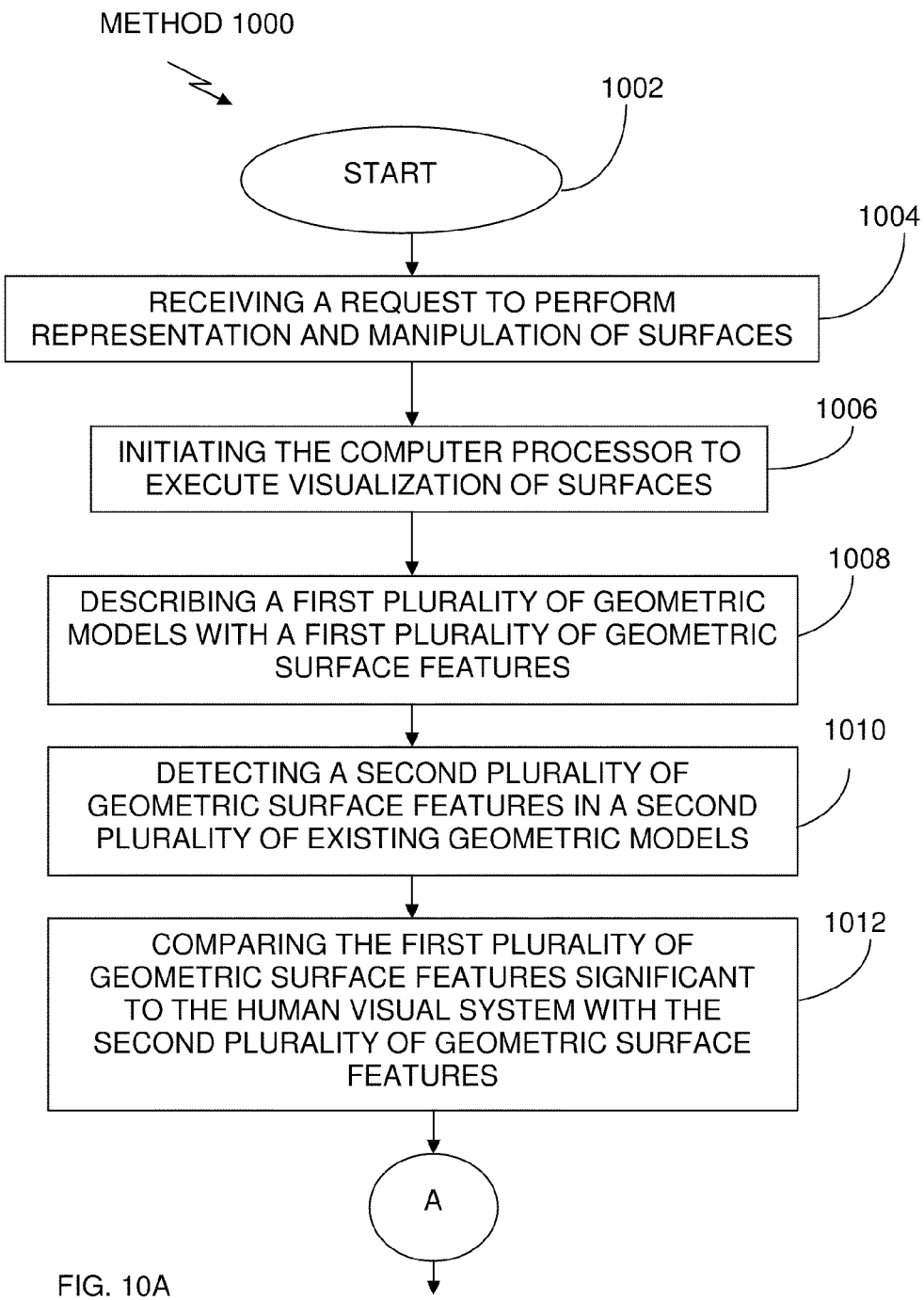
FIG. 10A illustrates method 1000, an embodiment of visualization of surfaces.
Figure 10B:
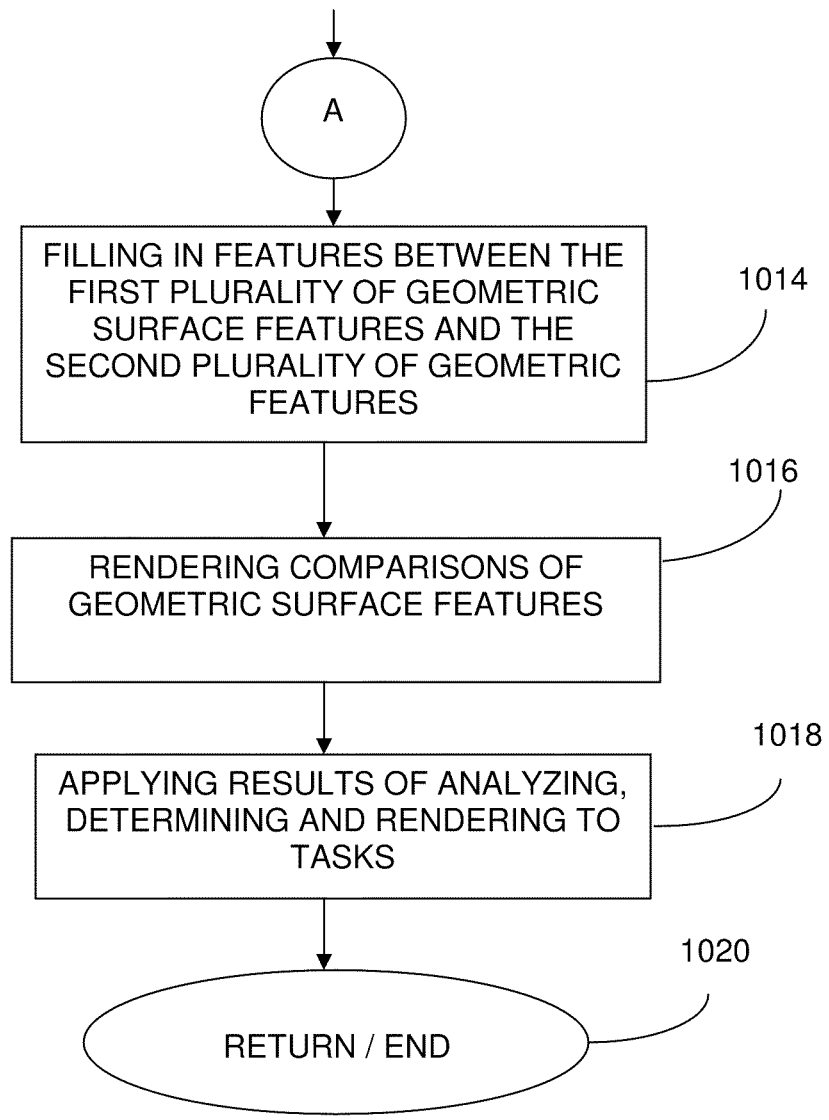
FIG. 10B illustrates a continuation of the method 1000.
Figure 11:
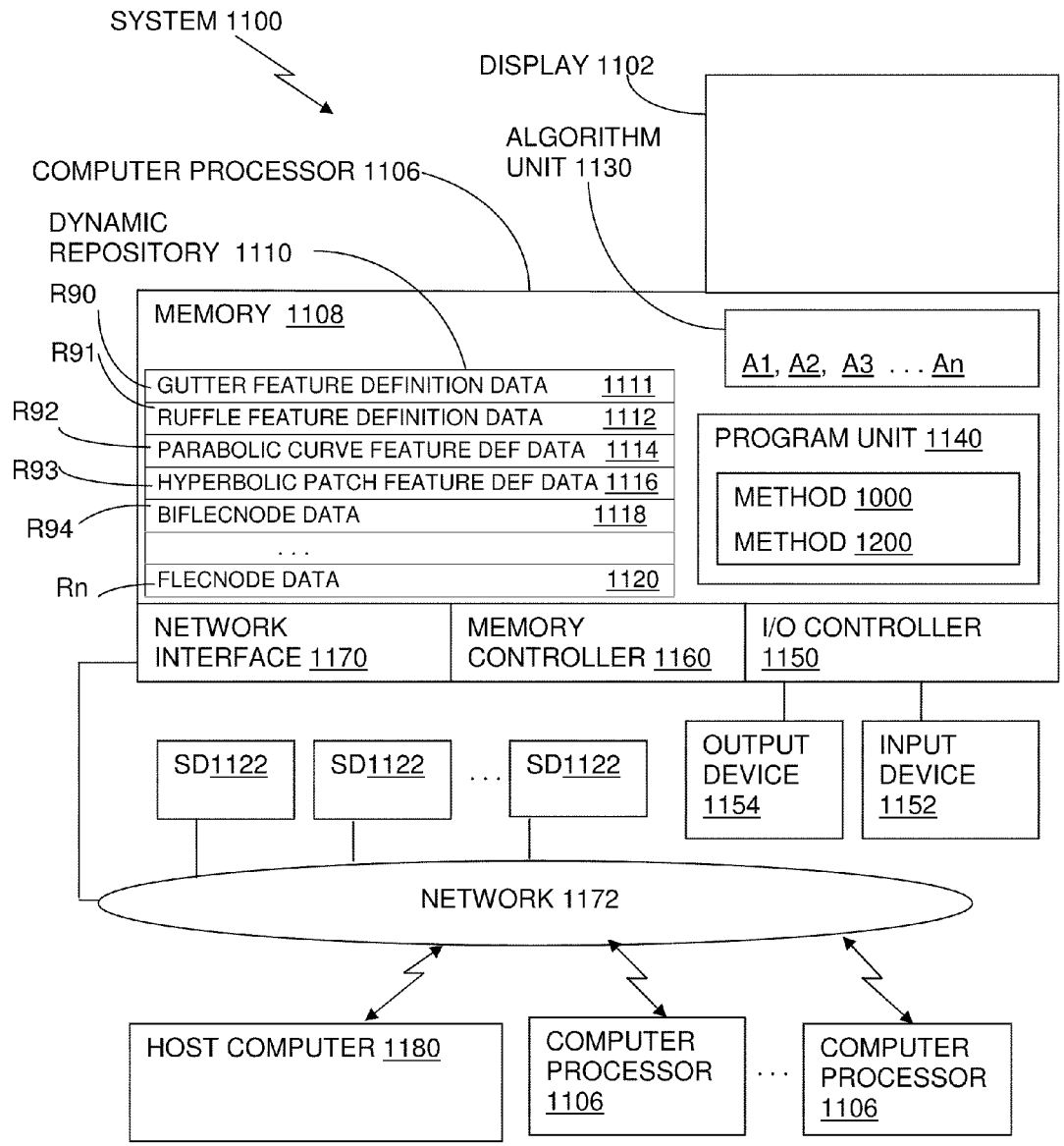
FIG. 11 illustrates a computer system 1100, which implements the various methods, procedures and operations of the method 1000 and/or the method 1200.

Referring to FIG. 10A, FIG. 10B and FIG. 11, in accordance with a first exemplary embodiment, a method 1000 is implemented in a computer readable and computer executable program code executed on a computer system 1100 (hereafter the "system 1100"). The method 1000 is implemented as a computer automated method of representation and manipulation of surfaces operations in a computer graphics rendering environment. The method 1000 automatically performs operations of representation and manipulation of surfaces using perceptual geometric features.

Referring to FIG. 11, in accordance with exemplary embodiments, the system 1100 embodies and implements the various methods, procedures and operations of the method 1000 in the structure of computer executable program code, computer executable and computer readable media and other hardware, firmware and software modules, network applications and interface platforms, upon which the method 1000 is carried out within the technological arts.

Referring again to FIG. 11, in accordance with exemplary embodiments, the system 1100 includes a computer processor 1106 (hereafter "the computer processor 1106") and communicatively coupled either externally or residing inside of the computer processor 1106 are a plurality of network interface controllers, input/output controllers, input devices and output devices, such as a network interface 1170, a memory controller 1160, an input/output controller 1150 (hereafter "the I/O controller 1150"), an input device 1152, an output device 1154, and a display 1102, where the display 1102 displays rendered graphic visualizations generated in the various exemplary embodiments.

Referring to FIG. 11, in accordance with exemplary embodiments, the network interface 1170 communicatively connects the computer processor 1106 to a network 1172, where a plurality of client side, server side and/or user networked devices reside, interact and operate communicatively over the network 1172. The network 1172 can be a wide area communications network, including an Internet or an extranet or the network 1172 can be a local area network, including an intranet. These networked devices can include host computers, such as a host computer 1180; these devices can include storage devices, such as tape drives, disc drives operating individually or in storage library farms, for example a plurality of storage devices can include a device such as one or more of an SD1122. These networked devices can also include a plurality of devices such as the computer processor 1106.

Referring again to FIG. 11, in accordance with exemplary embodiments, the input device 1152 can be at least one or more of a mouse, a keyboard, a touch screen terminal, a light pen wand, a joystick, a thumbwheel, a copier system or machine, a hardcopy paper scanner system or machine, a microphone or an electronic and/or a radio frequency scanning device or one or more biometric input and/or reading devices.

Figure 1B:
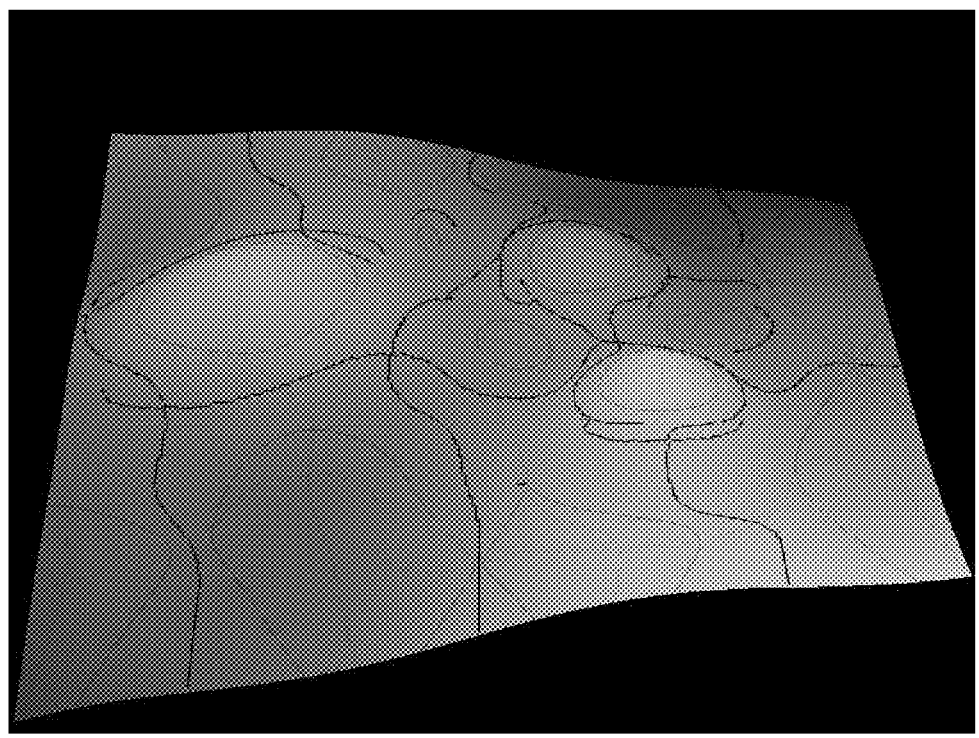
FIG. 1B shows curves from FIG. 1A overlaid on the surface.

In exemplary embodiments, the system 1100 and the method 1000 illustrated in FIG. 11, FIG. 1A and FIG. 1B respectively can be implemented in software, firmware or hardware or a combination of each. According to exemplary embodiments, the method 1000 is implemented in software, as executable program code, which comprises an ordered listing of executable instructions for implementing logical functions, and which is executed by either special or general purpose digital computers including a PDA, a personal computer, a workstation, a minicomputer or a mainframe computer.

In exemplary embodiments, the system 1100 is implemented in a general purpose digital computer designated as the computer processor 1106. The computer processor 1106 is a hardware device for executing software implementing the method 1000 and/or a method 1200. The computer processor 1106 can be any custom made or commercially available, off-the-shelf processor, a central processing unit (CPU), one or more auxiliary processors, parallel processors, graphics processors (or such as graphics processors operating as parallel processors), a semiconductor based microprocessor, in the form of a microchip or chip set, a macroprocessor or generally any device for executing software instructions. The system 1100 when implemented in hardware can include discrete logic circuits having logic gates for implementing logic functions upon data signals, or the system 1100 can include an application specific integrated circuit (ASIC).

Referring to FIG. 11, in accordance with exemplary embodiments, the computer processor 1106 further includes a memory 1108 (hereafter "the memory 1108"). Residing in the memory 1108 are a program unit 1140 (hereafter "the program unit 1140") and a dynamic repository 1110 (hereafter "the dynamic repository 1110"). Residing in the dynamic repository 1110 are a plurality of repository entry locations R90, R91, R92, R93, R94, up to and including Rn, where Rn theoretically represents an infinite number of repository entry locations limited only by known physical and/or virtual memory capacity. Thus, each repository entry location R90 up to Rn can hold, store and/or save a plurality of information and/or data including data such as gutter feature definition data 1111, represented as stored in repository entry location R90; ruffle feature definition data 1112, represented as being stored in repository entry location R91; parabolic curve feature definition (DEF) data 1114, stored and/or saved in repository entry location R92; hyperbolic patch feature definition data 1116, held in repository entry location R93, biflecnode data 1118, stored in repository entry location R94; and flecnode data 1120, saved in representative repository entry location Rn. These groups of data and information can be easily and programmatically accessed and exercised by the computer processor 1106 to provide various solutions to visualization, where visualization includes representation and manipulation requirements. In addition, a plurality of other data and information may be entered into the repository entry locations R90 through Rn, including mathematical rules and/or constraints. Furthermore, these groups of information and data, including the plurality of other data can be stored temporarily and/or permanently and/or semi permanently in the repository entry locations R90 through Rn. In exemplary embodiments, these groups of information and data can be downloaded programmatically over the network 1172 or entered manually by way of the input device 1152.

Referring again to FIG. 11, in accordance with exemplary embodiments, the memory 1108 further includes an algorithm unit 1130. Residing in the algorithm unit 1130, is a plurality of algorithms such as algorithm A1, algorithm A2, algorithm A3 up to and including algorithm An, where algorithm An theoretically represents an infinite number of algorithms limited only by known physical and/or virtual memory capacity. These algorithms can be in the form of one or more formulas, applets, macro programs and/or micro programs and/or any combination of such programs, applets and formulas. These algorithms are called by programmatic operations of the method 1000, either automatically or manually to perform certain routine computational tasks or provide required data and determinations. Furthermore, these algorithms can be stored temporarily and/or permanently and/or semi permanently in the algorithm unit 1130 or stored over the network 1172 in any of the plurality of storage devices, such as the SD1122 or in a repository (such as the dynamic repository 1110) in the computer processor 1106 or in the host computer 1180 or in any one or more of the computer processor 1106. In exemplary embodiments, the plurality of algorithms can be downloaded programmatically over the network 1172 or entered manually by way of the input device 1152. These algorithms can include face matching algorithms and/or model matching algorithms used in representation and manipulation of surfaces in the various exemplary embodiments. Also, these algorithms can include artificial intelligence applications.

Figure 13A:
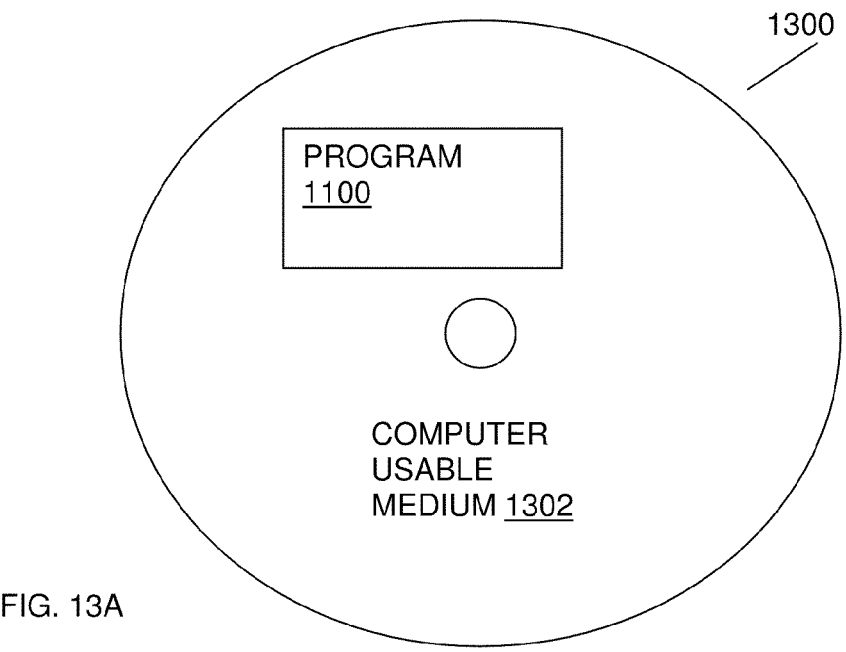
FIG. 13A illustrates a computer program product containing program code for the method 1000.
Figure 13B:
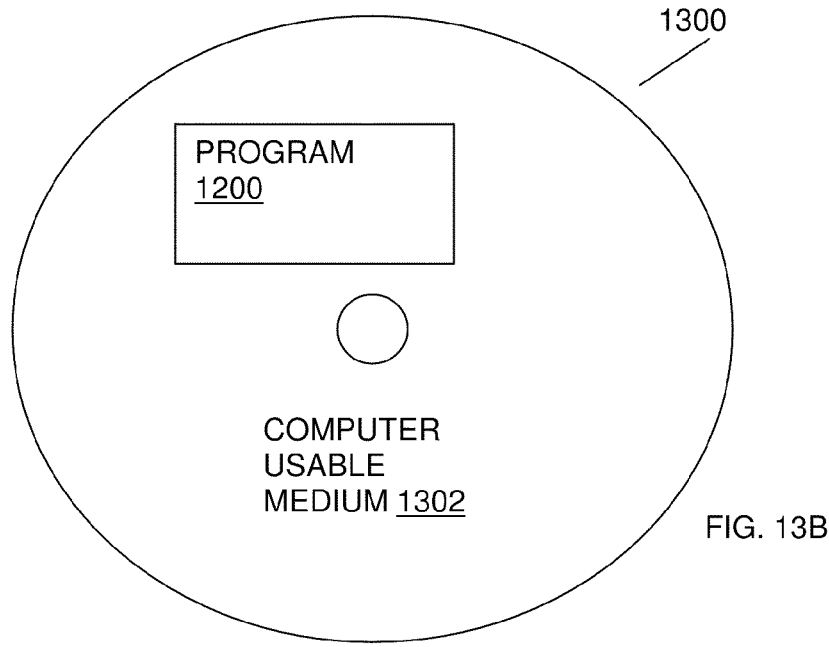
FIG. 13B illustrates a computer program product containing program code for the method 1200.

Referring to FIG. 11, FIG. 13A and FIG. 13B in accordance with exemplary embodiments, residing in the program unit 1140 is a plurality of computer readable and computer executable media (such as a computer usable medium 1302) which contain a plurality of computer programs, or algorithms and/or software applications, composing operations and procedures of the method 1000 and/or the method 1200 both encoded as computer readable and computer executable program code, contained in a computer program product 1300. In exemplary embodiments, software in the program unit 1140 includes a suitable operating system.

In exemplary embodiments, referring to FIG. 11, the memory 1108 and the dynamic repository 1110 and the plurality of storage devices including such devices as the SD1122 can include any one of or a combination of volatile memory elements, including random access memory (i.e., including RAM, DRAM, SRAM and/or SDRAM) and nonvolatile memory elements including read only memory (i.e., ROM, erasable programmable read only memory, electronically erasable programmable read only memory EEPROM, programmable read only memory PROM, and/or compact disc read only memory CDROM or FLASH memory or cache) magnetic tape, disk, diskette, cartridge, cassette and/or optical memory. The memory 1108 can have an architecture where various components are situated remotely from one another, but can be accessed by the computer processor 1106, either directly and/or locally through various communications buses or remotely over the network 1172.

Referring to FIG. 10A, and FIG. 11, in accordance with a first exemplary embodiment, at an operation start 1002 (hereafter "the operation 1002"), the system 1100 receives a signal from an operator or an individual user via either the input device 1152 or an automatic programmatic wake up signal from the computer processor 1106 which activates and initiates the computer executable program code implementing the method 1000. The method 1000, upon activation, performs other operations from selection signals received in the computer processor 1106 from the input device 1152, causing the method 1000 to be executed by the computer processor 1106 and in turn causing the computer processor 1106 to perform operations and procedures including calling algorithms and software applications and executing the instructions in the algorithms and applications to perform operations and sub operations of the method 1000 of providing various solutions to graphics visualizations requirements (where visualization includes representation and manipulation requirements), including comparing face models for recognition.

Referring again to FIG. 10A and FIG. 11, in accordance with the first exemplary embodiment, at an operation receiving request to perform representation and manipulation of surfaces 1004 (hereafter "the operation 1004"), the program code of the method 1000 executed by the computer processor 1106 of the system 1100 causes the computer processor 1106 to receive an initiation request, such as a request made by the user requesting representation and manipulation of surfaces. The request may be in the form of a signal from the user sent from the user's computer system, transmitted over the network 1172 and received by the computer processor 1106 or the request may be input through the input device 1152 by a user of the computer processor 1106, after the system 1100 receives the user's request for representation and manipulation of surfaces.

Referring to FIG. 10A, and FIG. 11, in accordance with the first exemplary embodiment, at an operation initiating the computer processor to execute visualization of surfaces 1006 (hereafter "the operation 1006"), in response to the user's request for visualization of surfaces (i.e., request for representation and manipulation of surfaces), the program code of the method 1000 executed by the computer processor 1106, causes the computer processor 1106 to automatically initiate the system 1100 to perform visualization of surfaces operations according to exemplary embodiments. Thus, the computer processor 1106 initializes graphics algorithms along with instructions for performing representation and manipulation of surfaces tasks.

Referring to FIG. 10A and FIG. 11, in accordance with the first exemplary embodiment, at an operation describing a first plurality of geometric models with a first plurality of geometric surface features 1008 (hereafter "the operation 1008"), the program code of the method 1000 executed by the computer processor 1106, causes the computer processor 1106 to describe geometric models with a first group and/or plurality of geometric surface features significant to a human visual system.

Referring to FIG. 10A and FIG. 11, in accordance with the first exemplary embodiment, at an operation detecting a second plurality of geometric surfaces features in a second plurality of existing geometric models 1010 (hereafter "the operation 1010"), the program code of the method 1000 executed by the computer processor 1106, causes the computer processor 1106 to automatically detect a second group and/or set of geometric surface features in a second group of existing geometric models comparable to the first set of geometric surface features. The first group of geometric surface features includes psychophysics geometric surface features.

Referring to FIG. 10A and FIG. 11, in accordance with the first exemplary embodiment, at an operation comparing the first plurality of geometric surface features significant to the human visual system with the second plurality of geometric surface features 1012 (hereafter "the operation 1012"), the program code of the method 1000 executed by the computer processor 1106, causes the computer processor 1106 to compare the first group of geometric surface features, which are significant to the human visual system, with the second group of geometric surface features, where comparing includes analyzing perceptual geometric features by considering the group of psychophysics feature models favoring the human visual system.

Referring to FIG. 10A, FIG. 10B and FIG. 11, in accordance with the first exemplary embodiment, at an operation fill in features between the first plurality of geometric surface features and the second plurality of geometric features 1014 (hereafter "the operation 1014"), the program code of the method 1000 executed by the computer processor 1106, causes the computer processor 1106 to automatically fill in features between the first group of geometric surface features and the second group of geometric features and determine shape transformation, determine shape matching, erosion modeling and morphing, using a model matching algorithm to create either a partial model or create a full and/or entire model of new features.

In exemplary embodiments, referring to FIG. 10A, FIG. 10B and FIG. 11, the method 1000 and or the method 1200 executed by the computer processor 1106, residing in the system 1100, can call various algorithms, such as algorithms A1, through algorithm An or execute programmatic routines or macro or micro programs to input and/or retrieve data and/or information into and out of the repository entry locations R90 through Rn residing in the dynamic repository 1110 and cause such data to interact with other algorithms and/or macro or micro programs or programmatic routines executing in the method 1000 program code and/or the method 1200 program code. Such data can be gathered and/or input programmatically into the algorithms, or programmatic routines or macro or micro programs and strings in the program code of the method 1000 where calculations and determinations or programmatically performed by the method 1000 and/or the method 1200, based on the method 1000 and/or the method 1200 program code executed by the computer processor 1106 residing the system 1100.

Referring to FIG. 10A, FIG. 10B and FIG. 11, in accordance with the first exemplary embodiment, at an operation rendering comparisons of geometric surface features 1016 (hereafter "the operation 1016"), the program code of the method 1000 executed by the computer processor 1106, and executing the model matching algorithm, causes the computer processor 1106 to automatically render comparisons of geometric surface features of the plurality of existing psycho-physics feature models and perceptual geometric features and either the partial model and/or the entire model of new features.

Referring to FIG. 10A, FIG. 10B and FIG. 11, in accordance with the first exemplary embodiment, at an operation applying results of analyzing determining and rendering to tasks 1018 (hereafter "the operation 1018"), the program code of the method 1000 executed by the computer processor 1106, causes the computer processor 1106 to automatically apply the results of analyzing, determining and rendering of feature models to tasks in which shapes or spatial relations must be analyzed, recognized and understood. The model matching algorithm can be a face matching algorithm or a terrain matching algorithm. In exemplary embodiments, the fundamental geometric property used to locate features is the surface curvature, which measures the change in the surface normal. Thus, the preliminary operation required for the matching algorithms is the computation of the surface normal. With this vector available, a number of perceptually significant geometric features are computed. The mathematical formulations given herein are derived from the differential geometry of the surface.

Referring to FIG. 10A, FIG. 10B and FIG. 11, in accordance with the first exemplary embodiment, at an operation return and/or end 1020 (hereafter "the operation 1020"), the program code of the method 1000 executed by the computer processor 1106, causes the computer processor 1106 to automatically either return to any operation 1004 through operation 1018 and continue such operation until the visualizations task(s) is/are complete or until the computer processor 1106 receives a signal to end, thus causing the operations to end.

In exemplary embodiments, the first representation considered is the mesh of vertices, edges, and faces. The representation is defined on either a regular or an irregular grid. Each face, which is a triangle or is decomposable into triangles, has a normal; the simplest technique to arrive at a normal for each vertex is to average these per face normal vectors into a per vertex normal vector. In exemplary embodiments, a more sophisticated approach, such as Normal Vector Voting, considers the relative size of the facets and all triangles within a neighborhood of the vertex which is within a defined distance. This distance may be set by the user or derived from properties of the mesh. The second representation considered is a height field defined by a function. For such a surface, a mesh of vertices may be computed by sampling the function (again, on a regular or irregular grid). The normal to such a height field is analytically determined through the surface derivatives, as follows:

$$N = \frac{1}{\sqrt{1 + f_u^2 + f_v^2}} [-f_u - f_v 1]^T \qquad (1)$$

Where,
N=normal;
$f_u$=a first tangent vector;
$f_v$=a second tangent vector; and
T=the tangent along the curve.

Similarly, normal vectors for an implicitly defined surface may be derived through derivatives.

Following any of these computations, what feeds into the following computations is a set of surface points and the normals at those points. A set of feature curves and a set of feature points may be derived by the following procedures.

Once the normal at a surface point is known, the displacement that occurs in that normal with an infinitesimal movement along the surface is the next important quantity for perceptual geometric features. In differential geometry, there are two important values: the first and second fundamental forms. The first fundamental form is the dot product of an infinitesimal surface displacement with itself; the second fundamental form is the dot product of the displacement vector along a surface with the change in the normal vector along that displacement. The ratio of the second fundamental form to the first is known as the normal curvature and typically denoted by $\kappa$.

As the direction of displacement rotates around a particular surface point, the value of $\kappa$ will generally vary between its maximum ($\kappa_1$) and minimum ($\kappa_2$) values. (The case of a constant value for $\kappa$ will be discussed below). The maximum value and minimum value are known as the principal curvatures and the directions in which these occur are known as the principal directions. It may be proven that these two directions form an orthogonal basis for the tangent plane; thus, they may be used, along with the normal, to form an orthonormal frame field for the surface at the point.

These directions may be computed through the Weingarten curvature matrix, W.

$$W = \frac{1}{EG - F^2} \begin{bmatrix} eG - fF & fE - eF \\ fG - gF & gE - fF \end{bmatrix} \quad (2)$$

Where
$e = N \cdot f_{uu}$ $E = f_u \cdot f_u$
$f = N \cdot f_{uv}$ $F = f_u \cdot f_v$
$g = N \cdot f_{vv}$ $G = f_v \cdot f_v$ The eigenvalues of W are the principal curvatures and the associated eigenvectors are the principal direction vectors expressed in the basis defined by the two tangent vectors $f_u$ and $f_v$. When the surface has a functional description, the derivatives may be computed symbolically and evaluated. In the case where the surface representation consists only of samples, the Weingarten matrix may be approximated from surface fitting or via finite differences to approximate the directional curvature.

Principal curvatures and directions will be used in this work to derive other surface properties. The mean curvature H is (as its name implies) the arithmetic mean of $\kappa_1$ and $\kappa_2$. The Gaussian curvature K is the product $\kappa_1 \cdot \kappa_2$. If the Gaussian curvature is negative, then the surface is hyperbolic (saddle-shaped). If both the principal curvatures are positive, then the surface is convex; if both are negative, the surface is concave. This gives perhaps the most basic classification of surface shape. One may integrate principal directions into curves at which the tangent is always pointing in a principal direction; this is known as a principal curve.

Figure 15A:
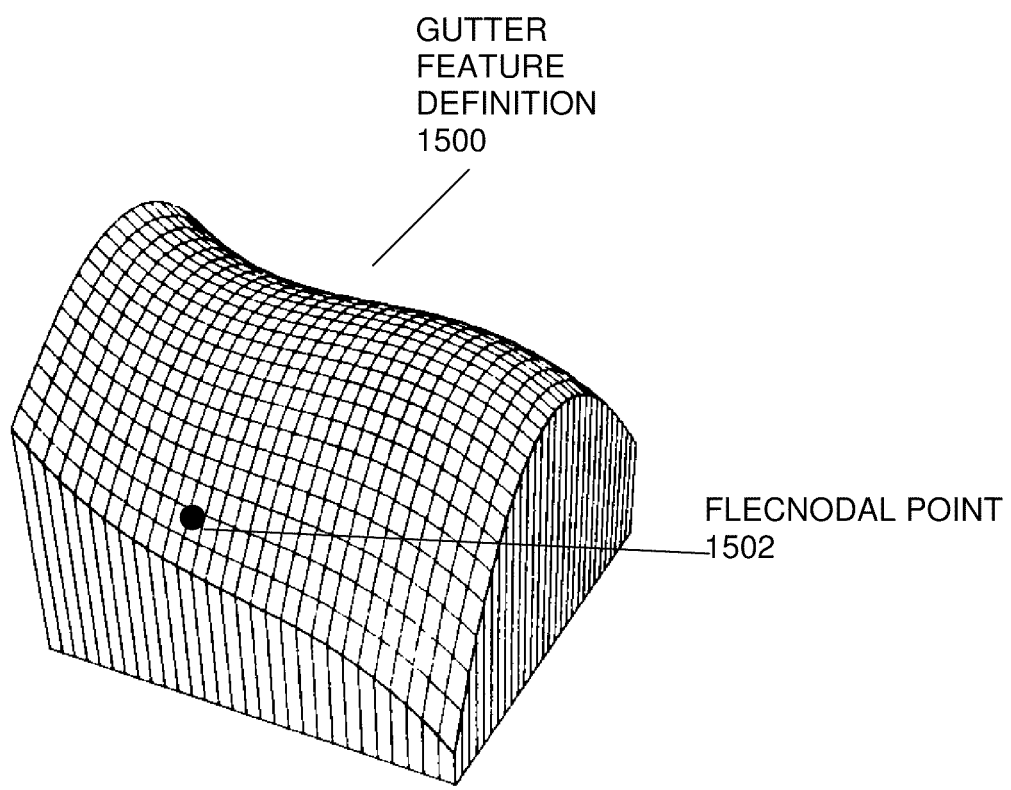
FIG. 15A illustrates a gutter feature definition and an associated flecnodal point.

The algorithms presented here assume that the curvature values are continuous. For a function, this may well be the case; for a discrete mesh or a sampled function that is not truly continuous in a sufficient number of derivatives, we may still proceed as if this were the case for any reasonably dense mesh of samples. Thus, a zero crossing is identified in one principal curvature when the surface changes between convex and hyperbolic or concave and hyperbolic. (We shall assume that a crossing from convex to concave does not occur instantaneously, and thus all crossings involve a hyperbolic region). The locus of points at which the Gaussian curvature is zero is known as a parabolic curve (see FIG. 15C which illustrates a parabolic curve definition feature).

A simple algorithm to find parabolic curves is to traverse the mesh until an edge is found for which the Gaussian curvature is negative at one endpoint and positive at the other. Along each such edge, a zero crossing of the Gaussian curvature may be interpolated. With the identification of one such edge and parabolic point, adjacent edges may be inspected to find adjacent points in the (approximated) parabolic curve, until a closed curve has been found. This curve may be represented with any number of approximating or interpolating methods (including a polyline).

A locus of points of locally maximum curvature forms a ridge, and similarly a locus of points of locally minimum curvature forms a valley and/or trough. Typically, one would expect to find two ridges running through each convex and concave region and a discrete set of ridges and valleys in hyperbolic regions. Points may be identified as being on or near a ridge (equivalently, a valley) in a mesh by sampling the curvature in offsets determined by the appropriate principal direction. If the point in question has a higher (equivalently, lower) value for the curvature, then a search for similar adjacent points may be seeded and a ridge (valley) traced. The search may be made more efficient by searching for a suitable adjacent point in the direction perpendicular (with respect to the 2D domain) to the direction in which the current point is judged to be extremal relative to its neighbors. Again, such a locus may be represented by any number of approximation or interpolation methods. However, unlike the parabolic curves, ridges, troughs, and valleys planes are not necessarily closed.

At hyperbolic points, there exist two more directions of interest. Another result from differential geometry is that the principal directions happen to be those directions in which the direction of change in the normal matches the direction of displacement being considered. Thus the change one would experience walking along a surface in a principal direction would be a sensation of falling perfectly forward or backward. In hyperbolic regions, there is a direction in which the displacement of the normal is orthogonal to the direction of the displacement; such directions are known as asymptotic directions. The change one would experience walking in an asymptotic direction would be the sensation of falling exactly to one side. These two directions may be found directly using the following relationship for the angle between asymptotic direction and the principal direction.

$$\tan^2 \alpha = -\frac{\kappa_1}{\kappa_2} \quad (3)$$

Where
  $k_1$ = a maximum value of the ratio of
    the second fundamental form to the first; and
  $k_2$ = a minimum value of the ratio of
    the second fundamental form to the first.

The asymptotic vectors may then be determined by the appropriate linear combination of the principal vectors. As with principal directions, one may integrate asymptotic directions into curves at which the tangent is always pointing in an asymptotic direction; this is known as an asymptotic curve.

Points of inflection in curves give information about the change in the curvature. A flecnode is a hyperbolic point at which one of the asymptotic curves (described above) inflects; that is, the geodesic curvature vanishes (a geodesic inflection is a point where geodesic curvature is zero (or approaches zero), while a regular curve has all velocity vectors different from zero. Such a curve can have no corners or cusps). This implies that the velocity (tangent) and acceleration of the curve are collinear. The instantaneous velocity of the asymptotic curve is the asymptotic direction, as specified above (of which there are two at hyperbolic points). The acceleration may be estimated by forward differencing of the asymptotic directions along those same asymptotic directions. That is, if A is the vector field of asymptotic directions and $A_{x,y}$ is the vector at the location (x, y), then the standard forward differencing $$A'_{x,y} = \frac{A_{x+\Delta,y+\Delta} - A_{x,y}}{\Delta} \quad (4)$$

estimates the acceleration of the curve. We can then apply a threshold to the dot product of the normalized tangent vector and normal acceleration vector ($A_{x,y} \cdot A'_{x,y}$) to determine whether a point is (or is near) a flecnode. This requires balancing the distance at which a point is tested (i.e. where the forward difference is taken) and the threshold. In practice, this become a difficult method for implementation. Assuming a stable algorithm for the identification of a single point, a search for such points that are on the same color of asymptotic curve may be seeded in the direction transverse to the local asymptotic direction, since this is a characteristic typical of flecnodal curves. (It is not an absolute property, however). Again, any number of approximating or interpolating curves may be used to represent the curve. Once flecnodes are determined, there are a variety of ways to connect them into curves.

In theory, it is possible for the normal curvature to be constant in all directions emanating from a particular point on the surface. Such a point is known as an umbilic point. These can easily be detected during traversal of the mesh by querying whether the computed principal curvatures are equal (to within a tolerance). In real data sets, one would expect noise to prevent such an event from occurring; however, radially symmetric functions would exhibit such points at their apex, as would a spherical cap everywhere within its domain.

A ruffle marks a point where a ridge and a parabolic curve of the same curvature (i.e. maximum or minimum) cross (also defined as a point on a surface giving rise to a cusp of the Gauss map). Thus, it has be said that ruffles mark points where a ridge and a parabolic curve belonging to the principal curvature of like color cross transversely. This serves as an easy basis for testing whether a point is a ruffle, since parabolic curves and ridges are identified above. The ridge and the parabolic curve must be of the same type—i.e. both of maximum or both of minimum curvature. A parabolic curve is labeled by the curvature that vanishes, so if the non-zero curvature is negative, then the parabolic curve is of maximum curvature.

Figure 15B:
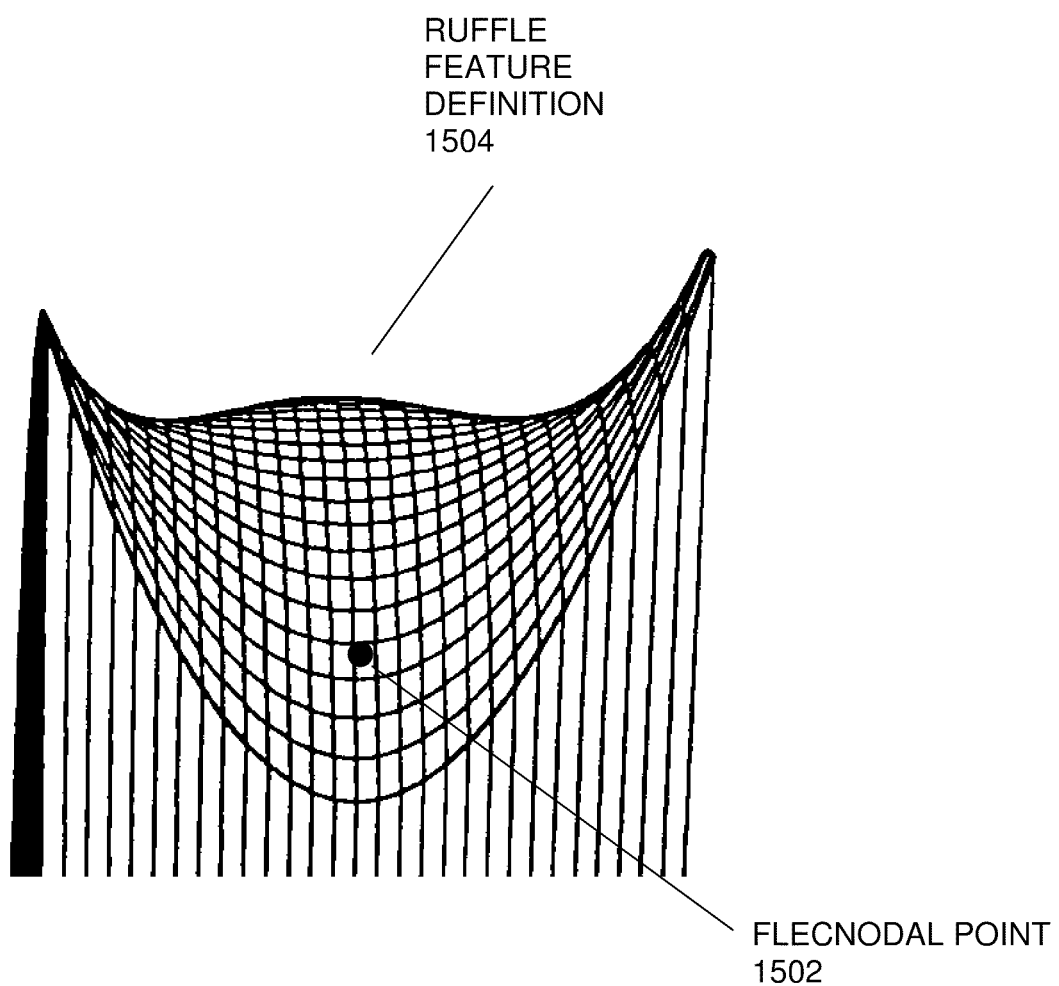
FIG. 15B illustrates a ruffle feature definition with an associated flecnodal point.
Figure 15C:
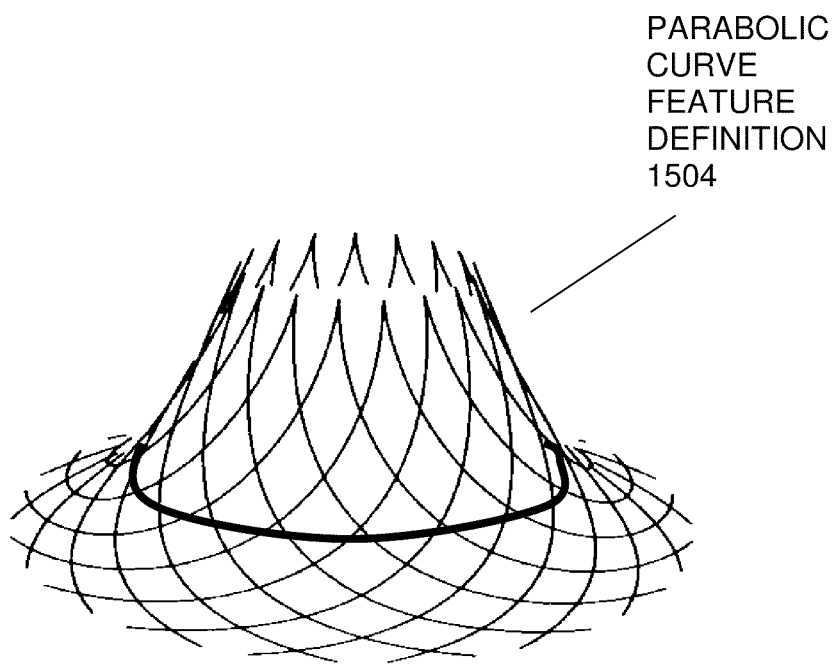
FIG. 15C illustrates a parabolic curve feature definition.

There is a computational question that arises in locating ruffles (see FIG. 15B which illustrates a ruffle feature definition). The intersection of a ridge and a parabolic curve must be on a facet adjacent to the relevant points that were originally used to construct each curve. If linear interpolation is used, the segments are planar and the question is considerably easier. Care must be taken to restrict the determination to the original surface if at all possible, or reasonable thresholds used. In this work, linear segments are used and thus crossings of ridges and parabolic curves are computed from the existence of intersections within triangular facets. If the intersection is not within the expected facet, it either does not exist or should be found on another facet. The locations thus identified are labeled as either a maximum or minimum ruffle.

Thus, in exemplary embodiments, a ruffle calculation of a ruffle simply requires programmatically identifying points in the mesh that are parts of both parabolic curves and ridges and then ensure they are of like color (If two curves are of like color, they are related to the same family of principal curves. In other words, the ridge and the parabolic curve must both contain the maximum or both contain the minimum principal directions throughout).

There are two types of ruffles: unodes and tacnodes. It has been said that the tacnode can be understood as an elliptic intrusion in a globally hyperbolic area, whereas the unode is the opposite; it has been said to be a hyperbolic finger pointing into the elliptic area. Other shapes and areas to be considered include planes, cylinders, spheres, ellipticals and hyperbolics.

In exemplary embodiments, differentiating between these two types of rufffles is accomplished by merely testing if the surface is synclastic (of positive Gaussian curvature, elliptic—concave or convex) or anticlastic (of negative Gaussian curvature, hyperbolic) in the local and global area of the ruffles that are identified.

Figure 16A:
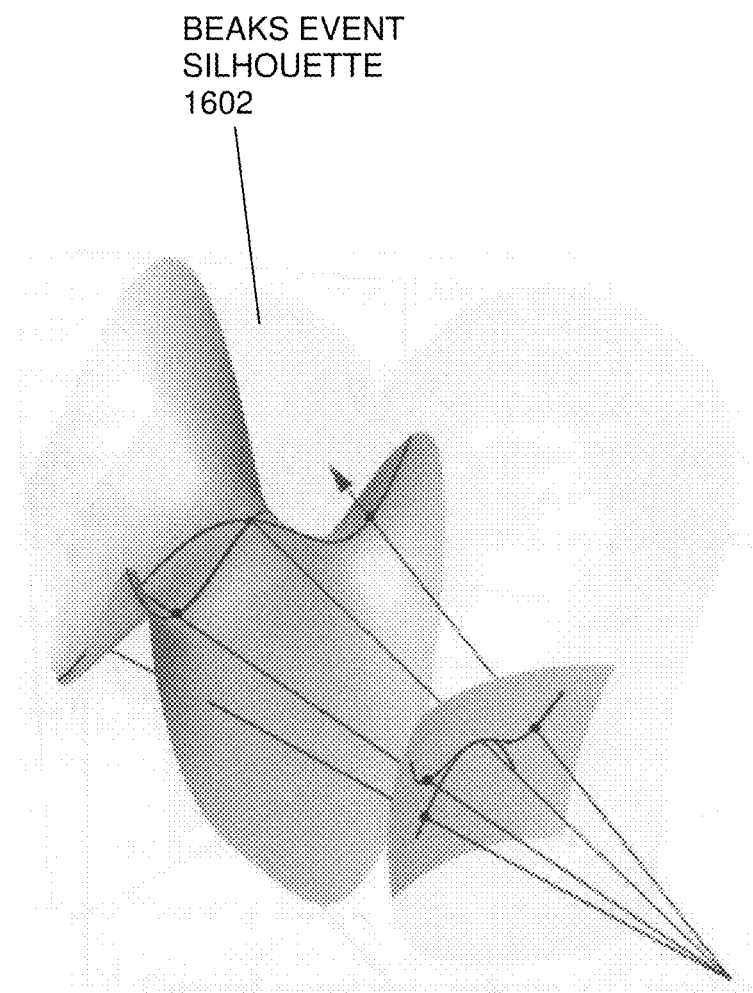
FIG. 16A illustrates visualization of a beak event on silhouette.
Figure 16B:
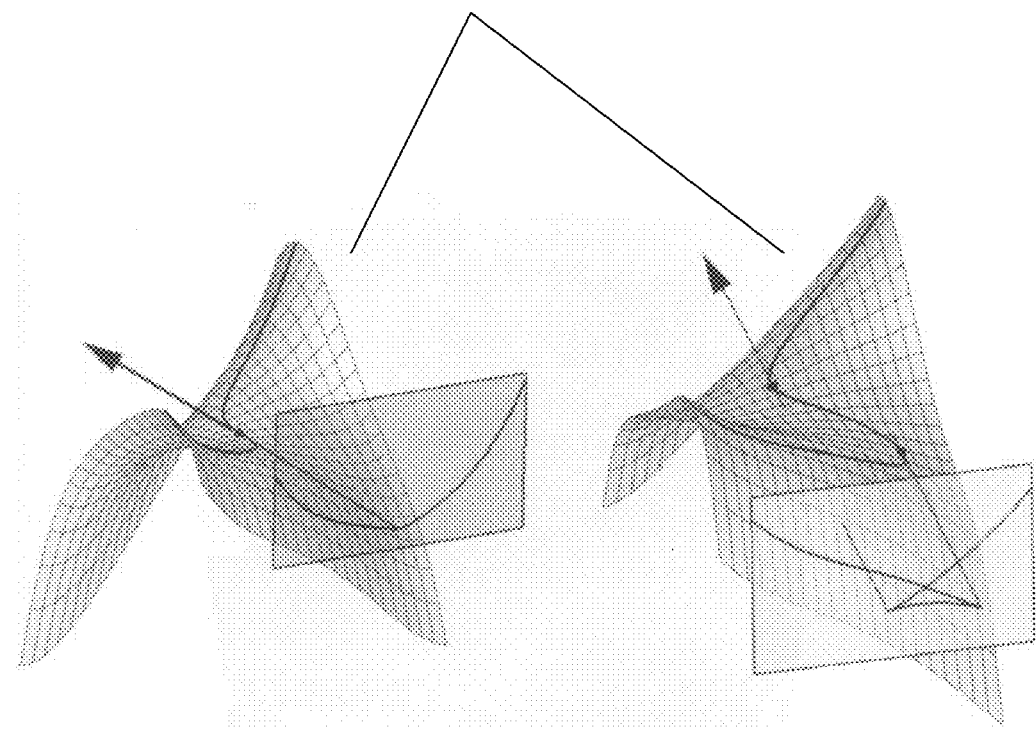
FIG. 16B illustrates visualization of a swallowtail event on silhouette.

In exemplary embodiments, evidence of features is manifested by visualization of events on silhouette. See FIG. 16A and FIG. 16B for renderings of a "Beaks" events and a "Swallowtail" event (showing flecnodal curves) respectively.

At certain points along a parabolic curve, the curvature that is nonzero along the parabolic curve may also instantaneously vanish. A point where this event occurs is labeled a gutterpoint (see FIG. 15A for an illustration of a gutter feature definition). To compute evidence for the existence of such a point requires computation of the cylinder axis at the parabolic point. This direction is essentially the limit of the two converging asymptotic directions as an observer on the surface approaches the parabolic curve from the hyperbolic side. The two asymptotic directions will become closer and closer until (on the parabolic curve) a single direction remains. Next, we can find those points for which the angle of this single converged direction with respect to the flecnodal curve is constant over a finite distance along the curve. Thus if the converged direction at a point is represented by the vector P and the tangent along the curve is represented by T, we identify points for which P·T is within a threshold of constant for a finite distance. As with the flecnodes themselves, this requires a delicate balance between the discretization and the tolerance and is difficult to achieve in practice.

In exemplary embodiments, because it is only necessary to find parts of the curve where the angle Q is constant, with the distance along the parabolic curve equal to zero, gutterpoint vectors can be calculated using $$\frac{\vec{P}_i \cdot \vec{T}_i}{\|\vec{P}_i\| \|\vec{T}_i\|} \quad (5)$$

and compared to other values along the parabolic curve.

In exemplary embodiments, the next feature point to consider is the biflecnode. It has been said that this is a point where an asymptotic curve is not transverse but tangential to a flecnodal curve of its own color.

It has been said that biflecnodes is taken from the Latin flectere, to bend, and nodus, a node. Often used for the undulations of planar curves, which are points with vanishing curvature as well as rate of curvature. In exemplary embodiments, the term is used for the special anticlastic points of a surface where one of the asymptotic curves has undulation. (One of the branches of the intersection with the tangent plane has an undulation, too). Such points occur generically as isolated points. The biflecnodes lie on the flecnodal curves. It has been said that an undulation point is a point at which the tangent to the curve has precisely four-point contact (also known as a fourth-order contact) with the curve instead of the usual two-point contact.

In exemplary embodiments, on order to locate biflecnodes, then what must be found are points in the mesh where the direction to the next point on the flecnodal curve is collinear with the asymptotic direction. Once again, tolerance needs to be addressed.

Figure 8:
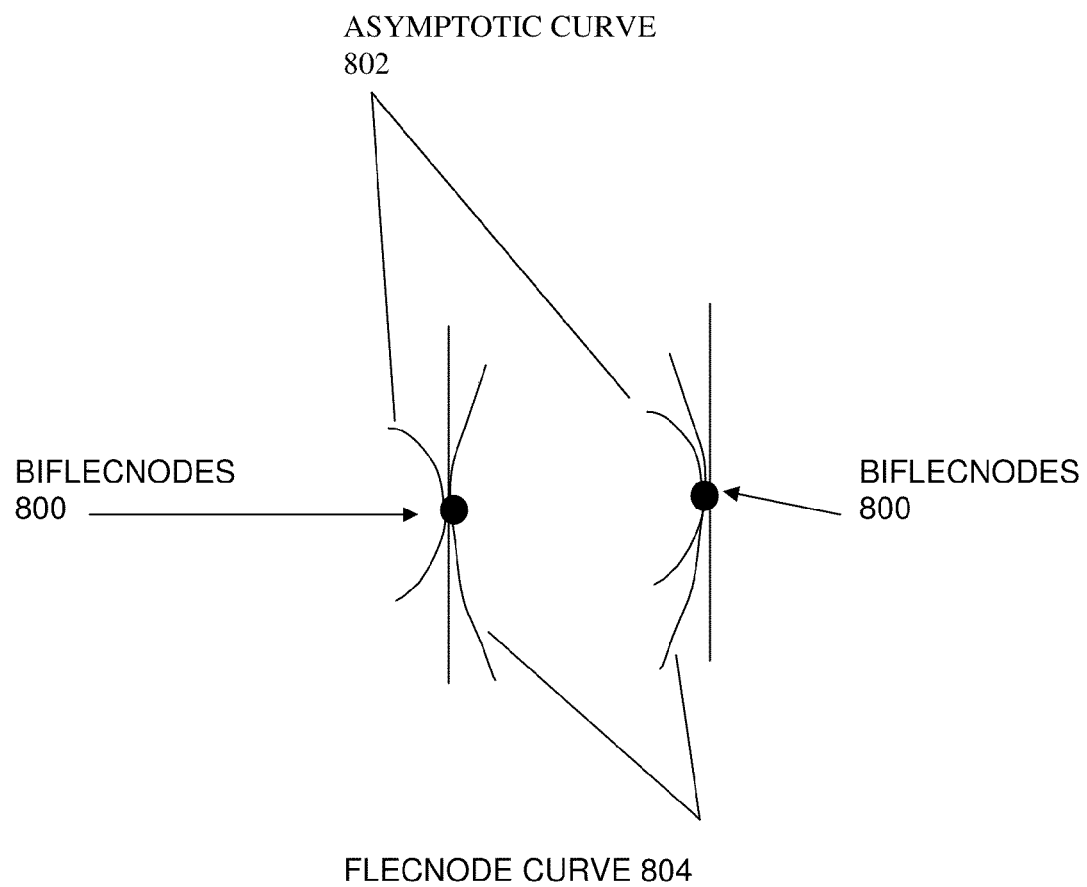
FIG. 8 illustrates biflecnodes, asymptotic curves and flecnode curves.

In exemplary embodiments the type of biflecnodes is found by using a line through the biflecnode in the asymptotic direction. The direction from a point on this line in the neighborhood of the biflecnode to the asymptotic curve and to the flecnodal curve could be compared. See FIG. 8, where the biflecnode is the central point, in each case.

In exemplary embodiments, with the estimated flecnodal curves in hand and asymptotic direction field, the algorithm to identify biflecnodes is as follows. First, approximate the tangent to the flecnodal curve through a symbolic derivative of the approximated curve or by differencing of a non-differentiable representation. Then compute the dot product of this vector with the asymptotic direction at that point. If it exceeds a threshold, then label the point as a biflecnode. Two types may be differentiated: those for which the asymptotic curve and flecnodal curve bend in the same direction and those for which they bend in opposite directions. To determine this, compute the vector to the next asymptotic point and the vector to the next flecnodal point. Compute the dot product of each vector with the normal to the asymptotic vector at the current point, restricted to the tangent plane. If these two dot products are of the same sign, then the asymptotic curve is on the convex side of the flecnodal curve. Otherwise, it is on the concave side.

In exemplary embodiments, the last feature point is the conical point, i.e., a point on a parabolic curve for which the developable axis forms a cone with the developable axis at nearby points on the parabolic curve. As per the discussion for biflecnodes, this developable axis is the convergence of the two asymptotic axes when the parabolic is approached from the hyperbolic side. If these axes at nearby points (nearly) converge to a single point, then the point under consideration is a conical point.

Figure 9:
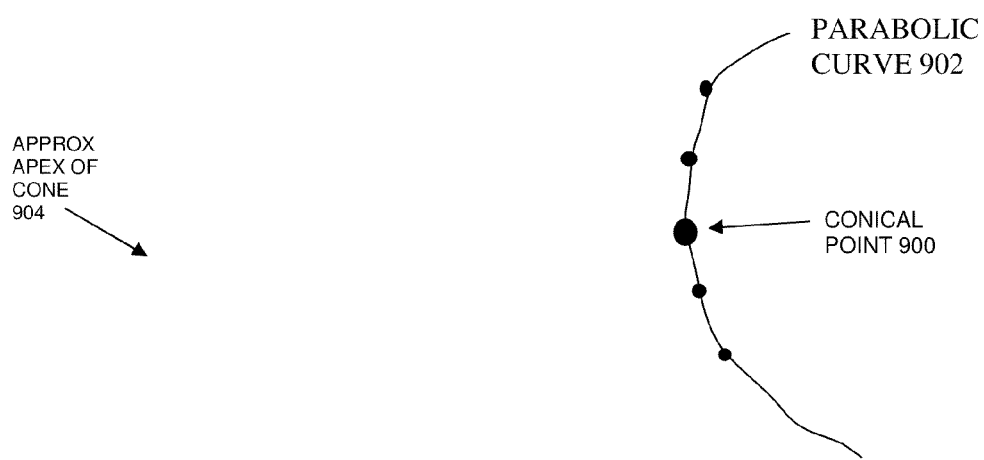
FIG. 9 illustrates a conical point, a parabolic curve, and an apex of a cone.

In exemplary embodiments, cylinder axes are essentially linear extensions of the remaining asymptotic direction at each point along a parabolic curve. Therefore, in considering a parabolic curve, a conical point occurs when all of these lines in the neighborhood of a specific point on the curve meet at or approach the same point. See FIG. 9, which shows the asymptotic directions extended as dashed lines. If the apex of a conical point is at either side of the parabolic curve, (also known as the spinodal curve), then in the neighborhood of any point on the parabolic curve, there will be an apex to a cone (unless all asymptotic directions are perfectly parallel.

Figure 1C:
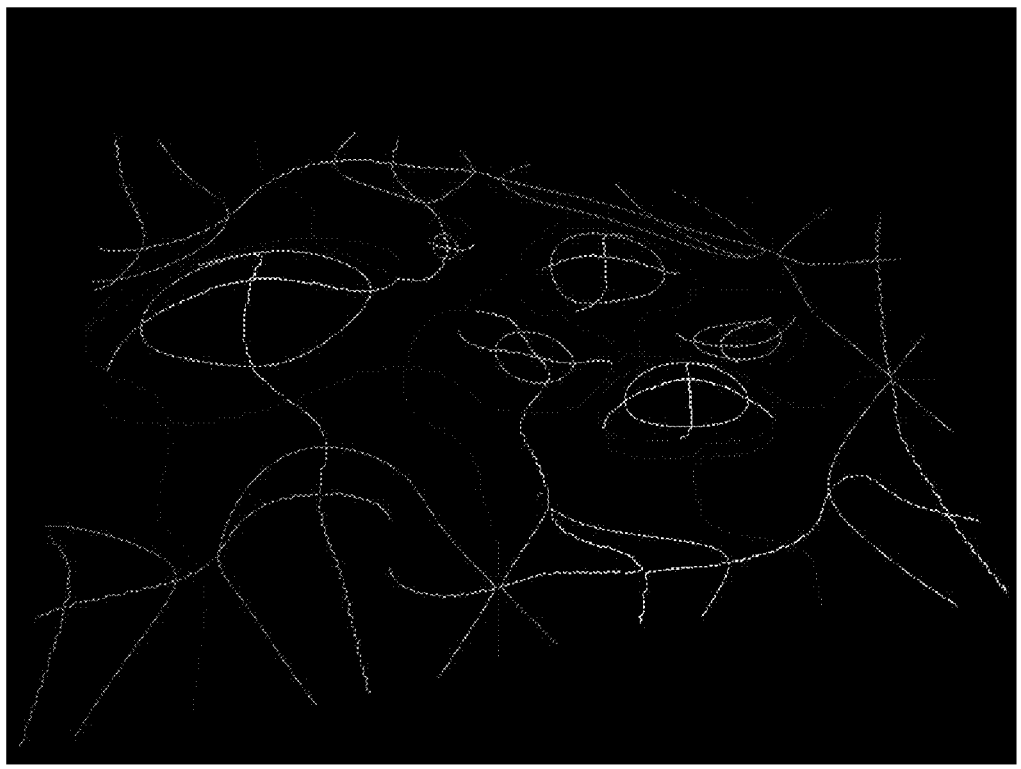
FIG. 1C illustrates parabolic curves, ridges, troughs and/or valleys of the shaded surface of FIG. 1A.

In regard to exemplary embodiments, and referring to FIG. 1A, FIG. 1B and FIG. 1C images from a simple terrain visualization program are shown. (FIG. 1A, FIG. 1B and FIG. 1C show terrain visualization with some of the curves specified. FIG. 1A shows the rendered result of a traditional visualization method, in which the terrain is shaded according to its height, with the minimum height at intensity of 0.1 and the maximum at 0.8. In FIG. 1C there are parabolic curves, ridges, and valleys of the surface, shaded with the same function (which does not yield the identical intensity range). FIG. 1B shows the curves overlaid on the surface. In FIG. 1B, the network of ridges and valleys highlight the local extrema of the surface. The parabolic curves help tie this network together. The sparseness of the representation is one of its greatest advantages; it captures the details of the surface that are interesting to the human visual system, yet is easily enables the user to see through to underlying structures. The difference in the visualization here and the closest previous work is the presence of the parabolic curves. For large terrain databases, point features are too small to be useful through visual representations. However, these point features are useful in the process of reduction of the number of points necessary to represent the curve features.

Figure 14:
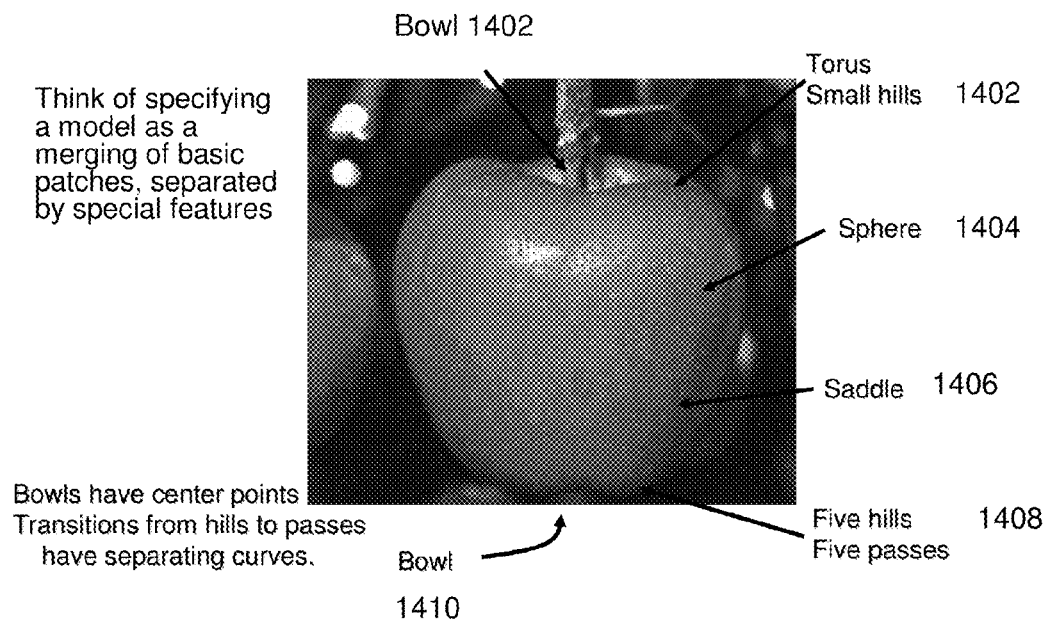
FIG. 14 illustrates an Example Model showing An Apple.

The human visual system (which encompasses the eyes through cognitive brain function) builds a mental model of a shape in which we naturally describe a hierarchy for a shape, e.g. a basketball is described as a sphere with line-shaped indentations and small bumps. Also, see the apple model illustrated in FIG. 14. Thus, these features form a language for describing a model. This language is used in model matching algorithms in feature filling operations to fill in missing features between the first plurality of geometric surface features significant to the human visual system and the second plurality of geometric features on existing geometric models, i.e. to connect features together without solely relaying on standard model descriptions. This is most similar to constructive solid geometry, in which shapes are built by additions and differences between simple shapes like cubes, spheres, et al. But it is different in that closed shapes are not used in the current method. It is also similar to methods that use "basis functions" like sine waves (Fourier transform); or exponentials; or wavelet transforms. But here the basis functions are the existence of these features, which—importantly—capture the "shape" as the human visual system does, not as some arbitrary mathematical function does. (Inevitably, those mathematical functions miss features). This requires "rules" for what happens in-between features and a hierarchical description to determine which are the dominant features. This is as opposed to specifying that (for example) a principal curve exists on a surface specified as a height field or simply detecting such a feature (see FIG. 17A and FIG. 17B for examples of feature detection). Of course, these types of specifying are performed as well, since a new description should be able to translate from a previous one.

Figure 17A:
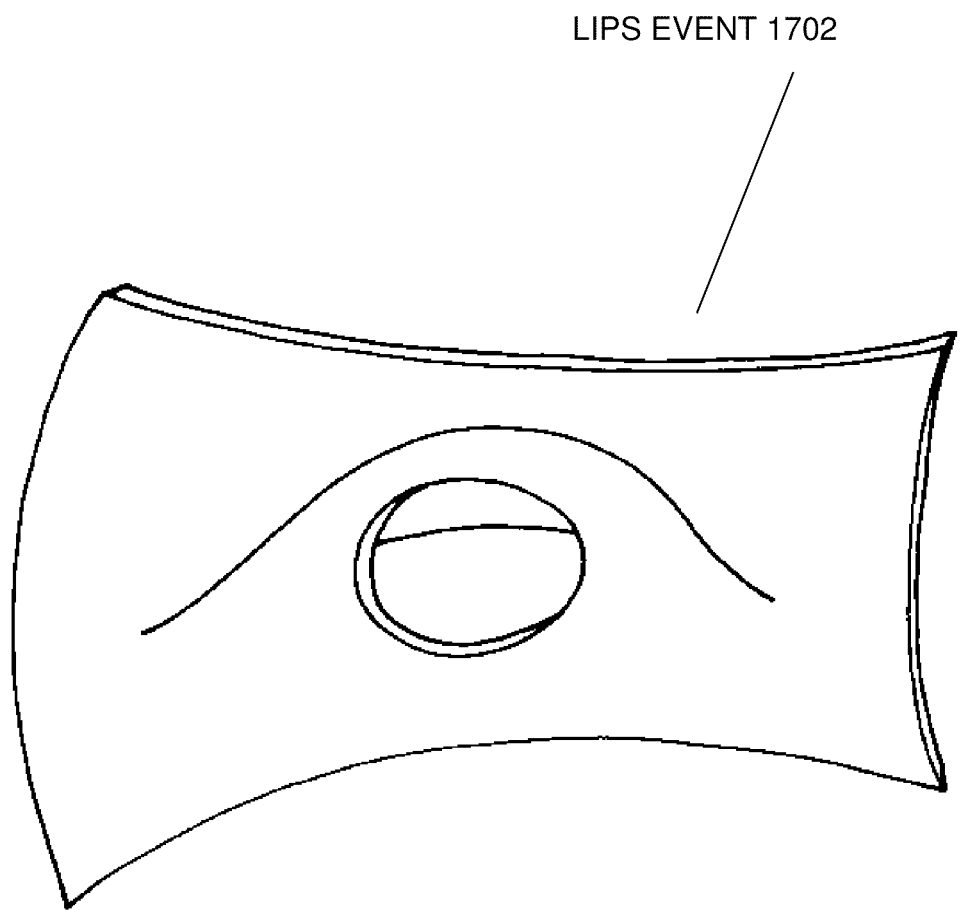
FIG. 17A illustrates a "Lips" event.
Figure 17B:
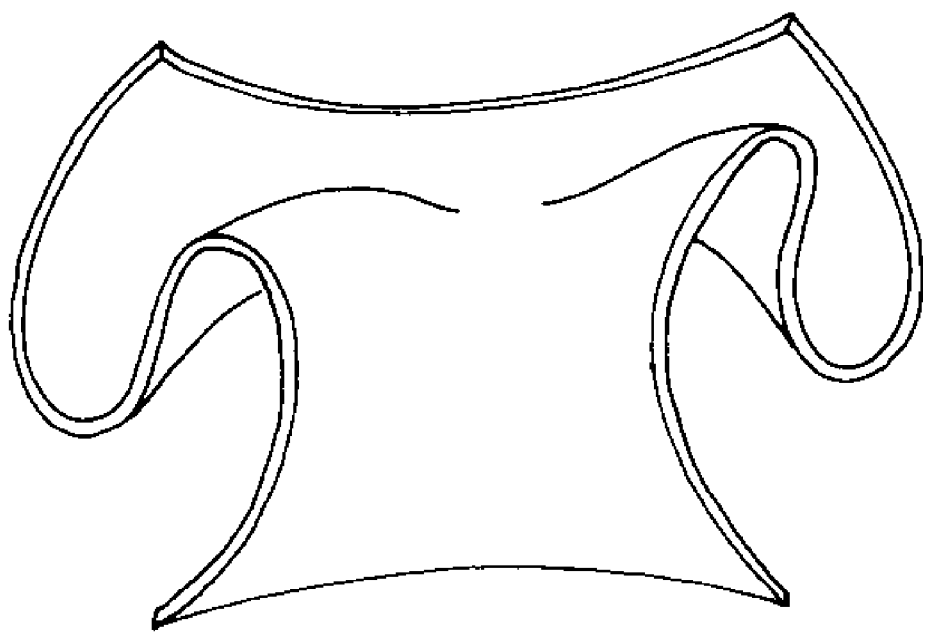
FIG. 17B illustrates a "Beaks" event.

In exemplary embodiments, feature detection is accomplished by developing algorithms to detect image based features and/or events, then existing algorithms are used to measure surface properties that identify detected feature points and curves. FIG. 17A shows a "Lips" event which gives evidence of parabolic curves. FIG. 17B shows a "Beaks" event which also gives evidence of parabolic curves.

Exemplary embodiments can utilize knowledge base systems approaches to knowledge representation and manipulation including: ruled based systems, which capture knowledge in the form of structured if-then statements, model based reasoning using algorithms and/or software models to capture knowledge or to emulate real processes; neural networks comprising a network of nodes and connections (i.e., neural nets) for capturing knowledge, i.e., the neural nets can learn by using examples; thus, neural networks can be considered a type of artificial intelligence technology that imitates the way a human brain works; fuzzy logic for representing and manipulating knowledge which is incomplete or imprecise; and decision tree implementations which capture decision making that can be expressed as sets of ordered decisions. Fuzzy logic is sometimes combined with other knowledge based technologies. Also, artificial intelligence (AI) and cognitive modeling can be used in exemplary embodiments, where AI can involve simulating properties of neural networks, where AI technologies can solve particular tasks and where cognitive modeling includes building mathematical models of neural systems.

In a first exemplary embodiment, one application in which end users view surfaces is a probabilistic forecasting application. Each surface may represent, for example, trends in a variable from a GIS database (e.g. census figures), weather predictions, or potential future urban layout. One useful feature in a system that assists with predictions is to see how various surfaces relate to one another. With any filled (even translucent) representation, the changes in the portions of the surfaces that are behind another portion of either surface become difficult to see. The surface visualization resulting from the features presented in the previous section enable our users to see behind occluding portions of the surfaces and relate the surfaces at multiple locations without discovering a precise viewpoint which shows both surfaces (see FIG. 2).

Figure 2:
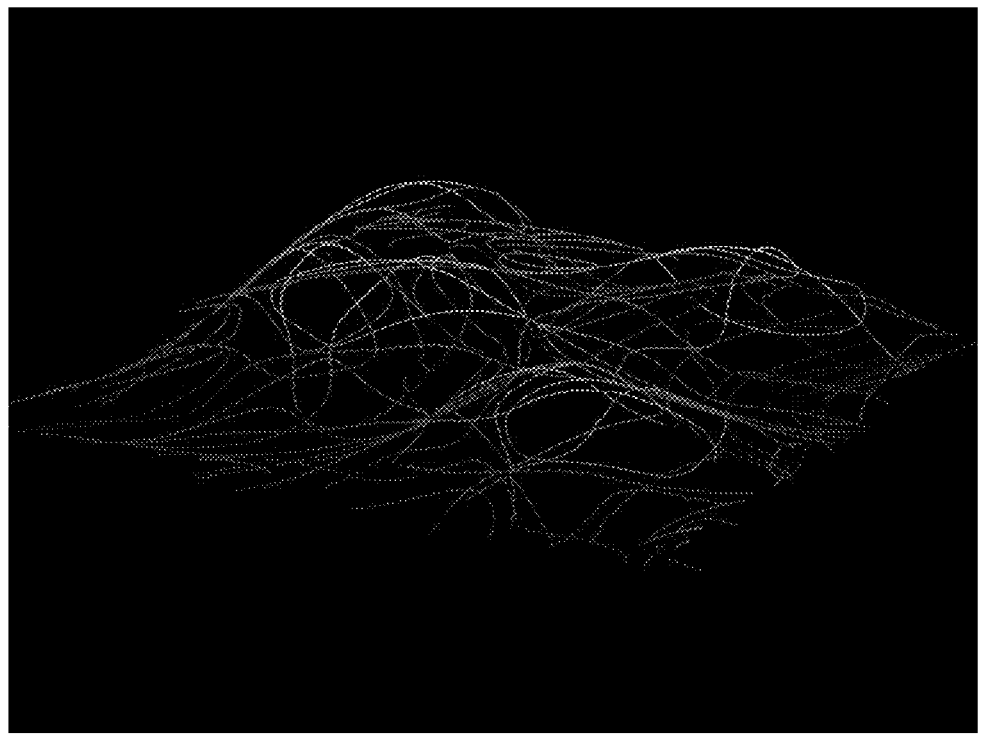
FIG. 2 illustrates two surfaces visualized with parabolic curves, ridges, troughs and/or valleys.

In FIG. 2, two surfaces are visualized with parabolic curves, ridges, and valleys. Although the filled surfaces have been removed, the intensity shading of the curves and a little practice enables users to understand both surfaces and their relationship to each other.

Figure 3A:
FIG. 3A illustrates three surfaces visualized with the parabolic curves, ridges, troughs and/or valleys.
Figure 3B:
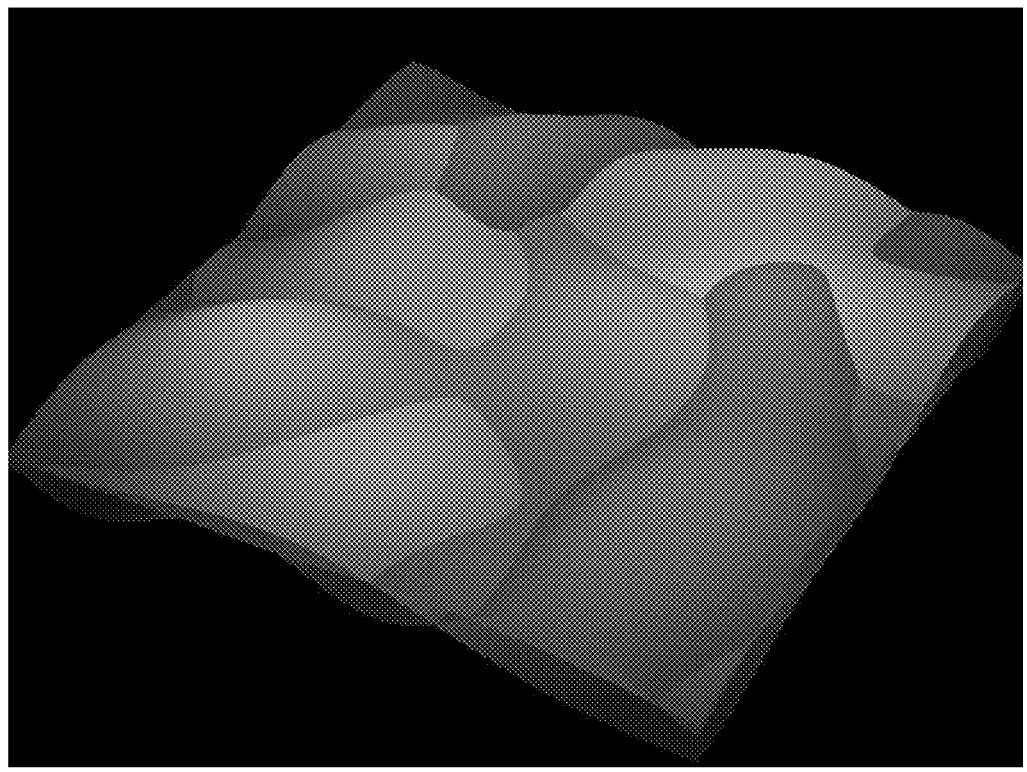
FIG. 3B illustrates solid surfaces of the three surfaces visualized in FIG. 3A.

In exemplary embodiments, it becomes progressively more difficult to understand the multiple surfaces; this applies to any representation. But a solid surface representation suffers from a number of problems. The representation is visually dense, making it difficult to perceive the surface and in fact, due to the combination of colors, misleading to see through multiple surfaces. In addition, in order to render the surfaces with less than full opacity, a back-to-front order must be presented to the graphics pipeline. While theoretically easy, it becomes computationally burdensome to properly compute the curves of intersection between the patches into patches in which the ordinal depth is constant. Renderings of a three-surface example appears in FIG. 3A and FIG. 3B. In FIG. 3A, three surfaces are visualized with the parabolic curves, ridges, and valley, where FIG. 3B illustrates associated solid surfaces. Note that the complex interactions between the three surfaces make it prohibitively expensive to determine the visibility order for proper transparency, whereas the feature-based representation, while complex, does permit multiple surface viewing.

Figure 4:
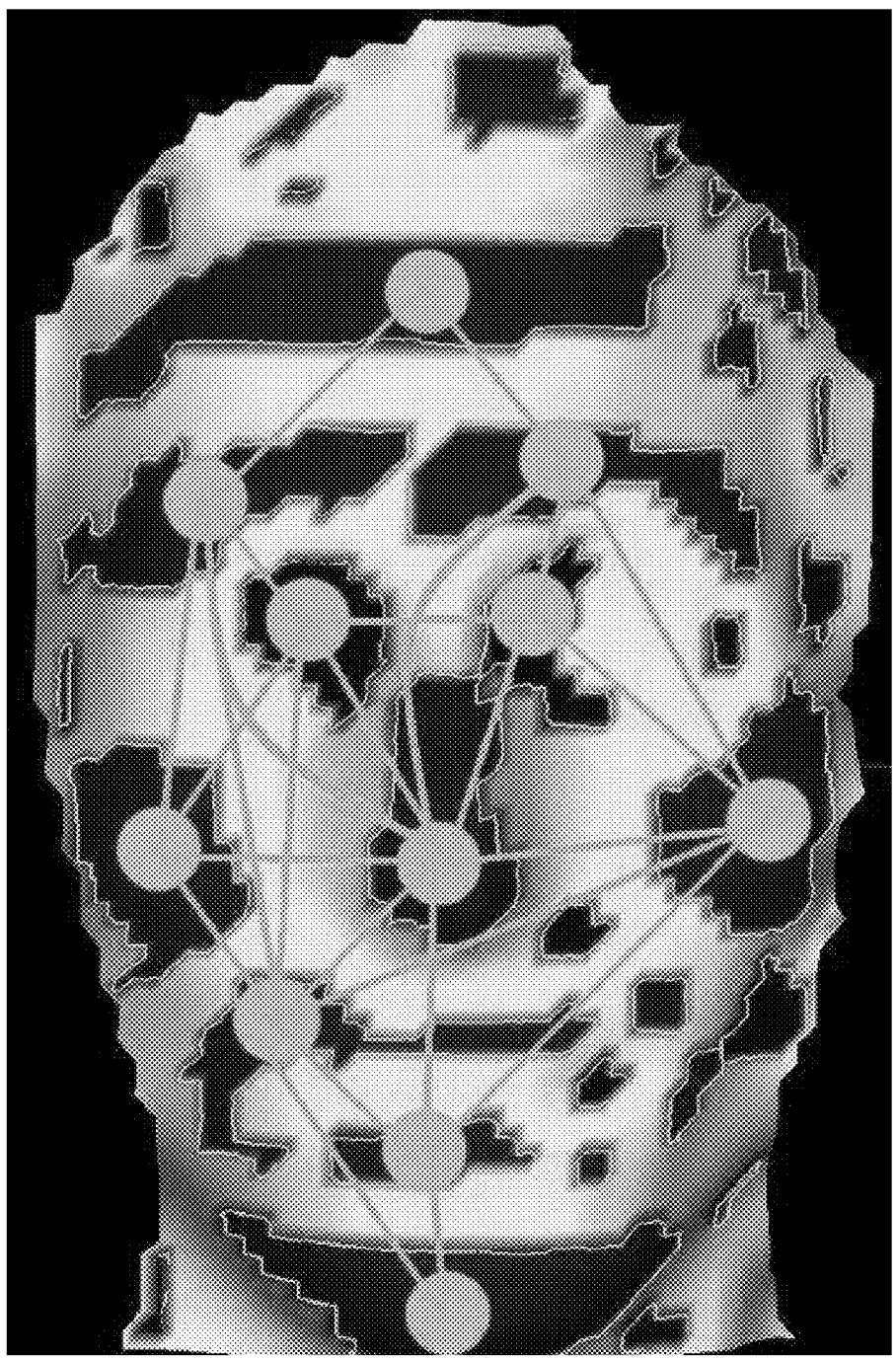
FIG. 4 illustrates an association graph over a face mesh, which shows convex regions, such as the chin and nose; concave regions, such as the eyes; and circles indicating nodes of the attribute graph, where the several lines and curves indicate edges.
Figure 5A:
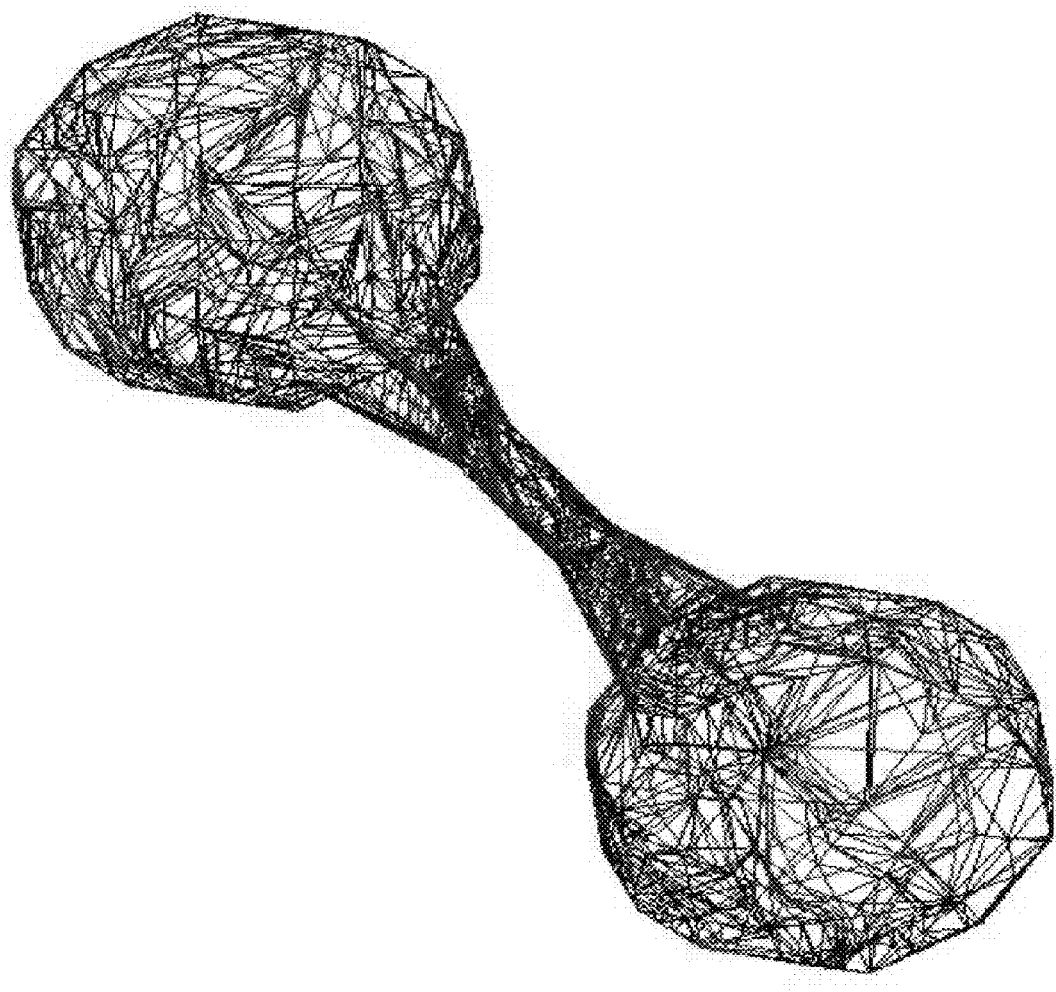
FIG. 5A illustrates a polyhedral model, decomposable into patches appropriate for surface matching.
Figure 5B:
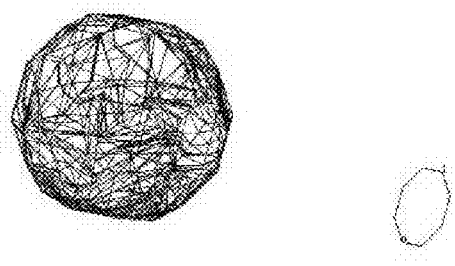
FIG. 5B illustrates the polyhedral model shown in FIG. 5A, decomposed into patches appropriate for surface matching.
Figure 5C:
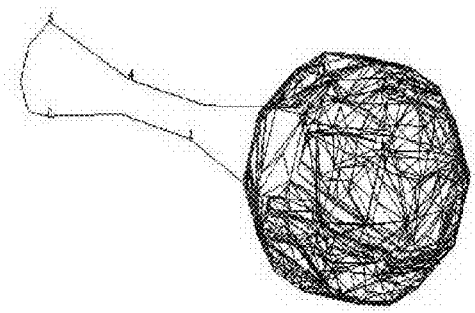
FIG. 5C illustrates the polyhedral model shown in FIG. 5A, decomposed into a patch appropriate for surface matching.
Figure 5D:
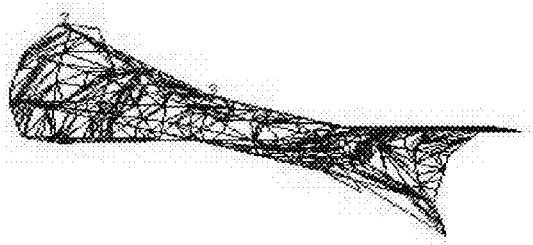
FIG. 5D illustrates the polyhedral model shown in FIG. 5A, decomposed into a patch appropriate for surface matching.
Figure 5E:
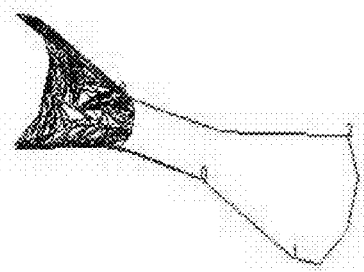
FIG. 5E illustrates the polyhedral model shown in FIG. 5A, decomposed into a patch appropriate for surface matching.
Figure 5F:
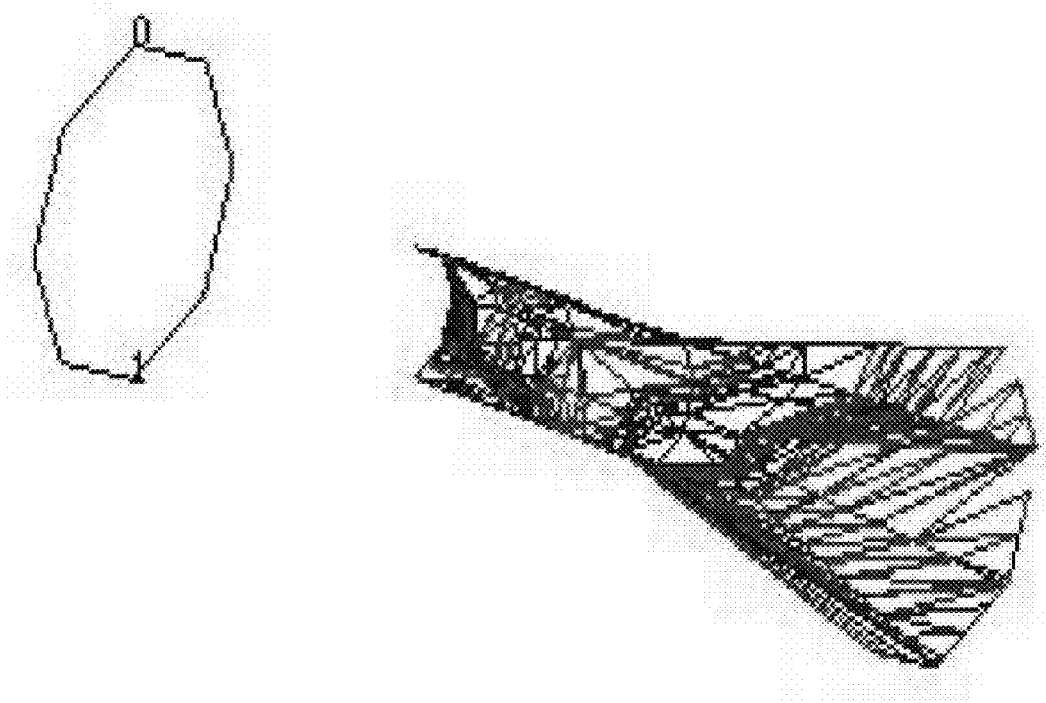
FIG. 5F illustrates the polyhedral model shown in FIG. 5A, decomposed into patches appropriate for surface matching.
Figure 6A:
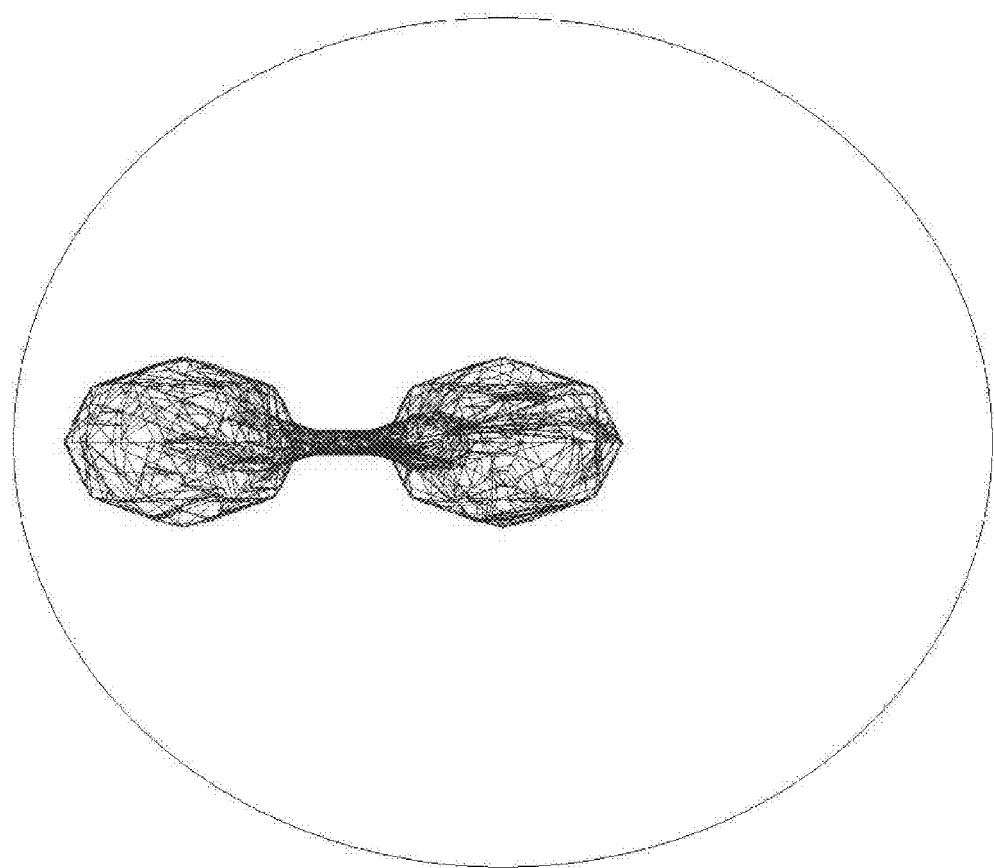
FIG. 6A illustrates a stage of an automatically-computed metamorphosis between two polyhedral models, using patches from the model shown in FIG. 5A.
Figure 6B:
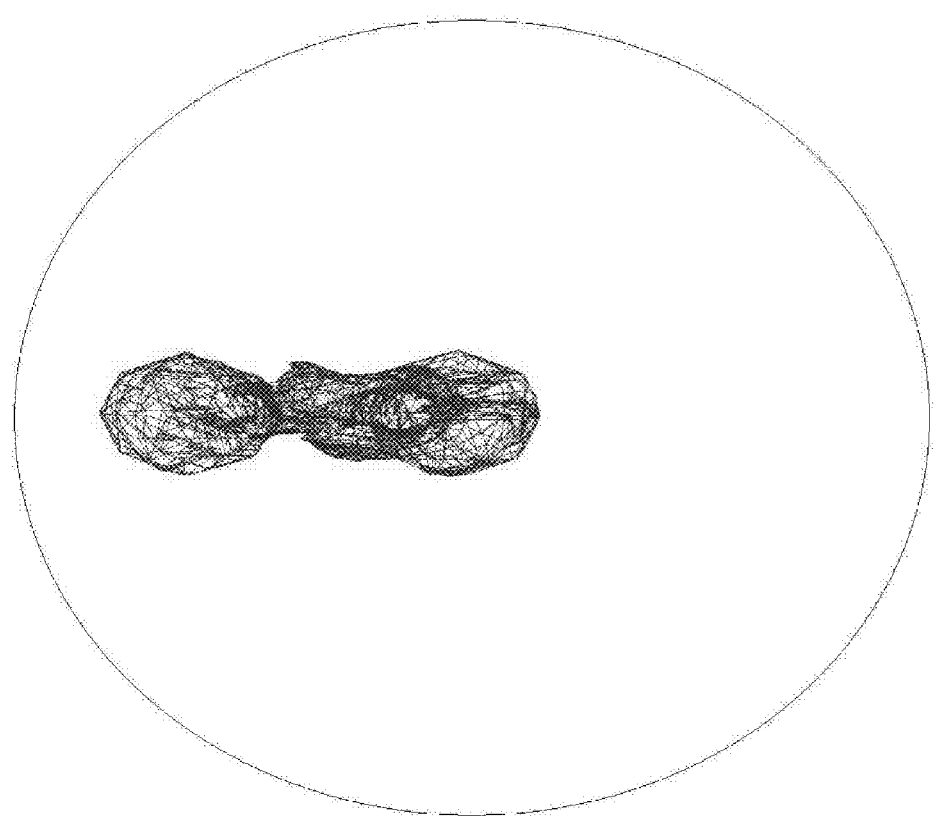
FIG. 6B illustrates a stage of an automatically-computed metamorphosis between two polyhedral models, using patches from the model shown in FIG. 5A.
Figure 6C:
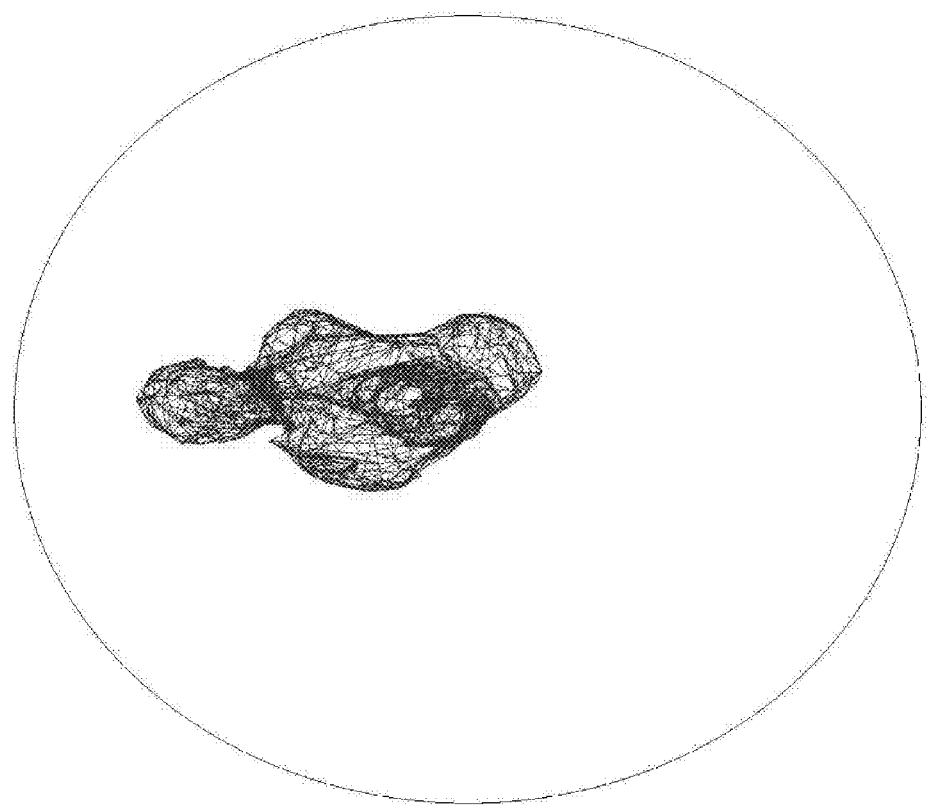
FIG. 6C illustrates a stage of an automatically-computed metamorphosis between two polyhedral models, using patches from the model shown in FIG. 5A.
Figure 6D:
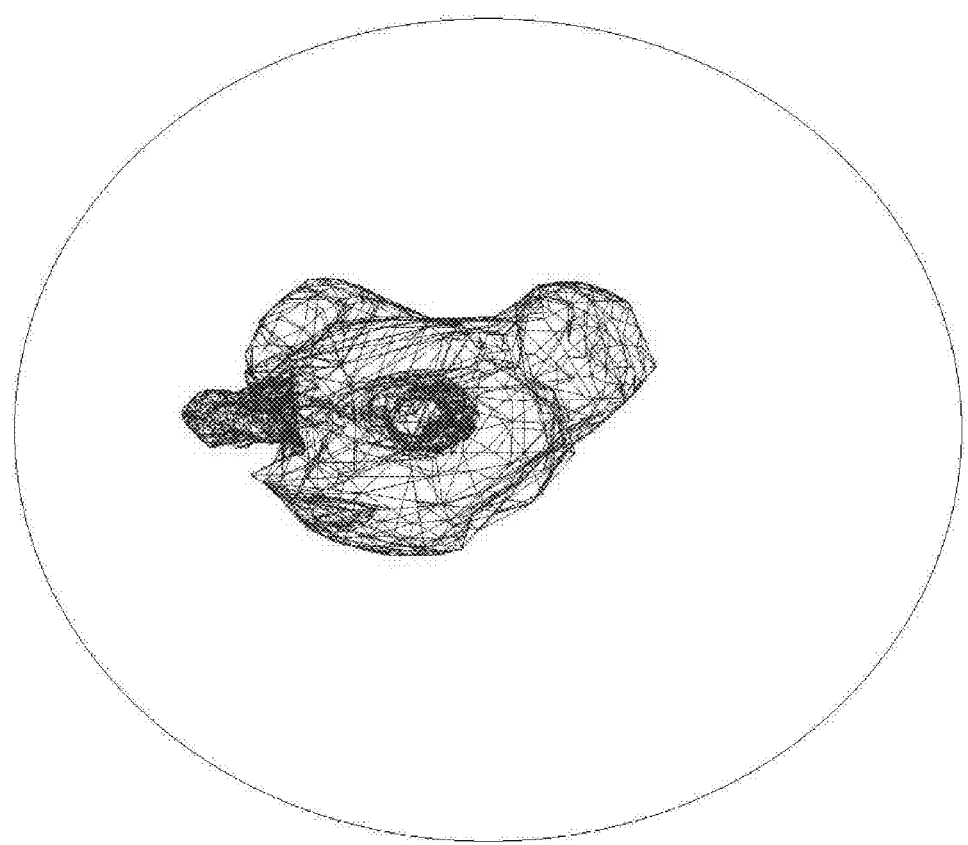
FIG. 6D illustrates a stage of an automatically-computed metamorphosis between two polyhedral models, using patches from the model shown in FIG. 5A.
Figure 6E:
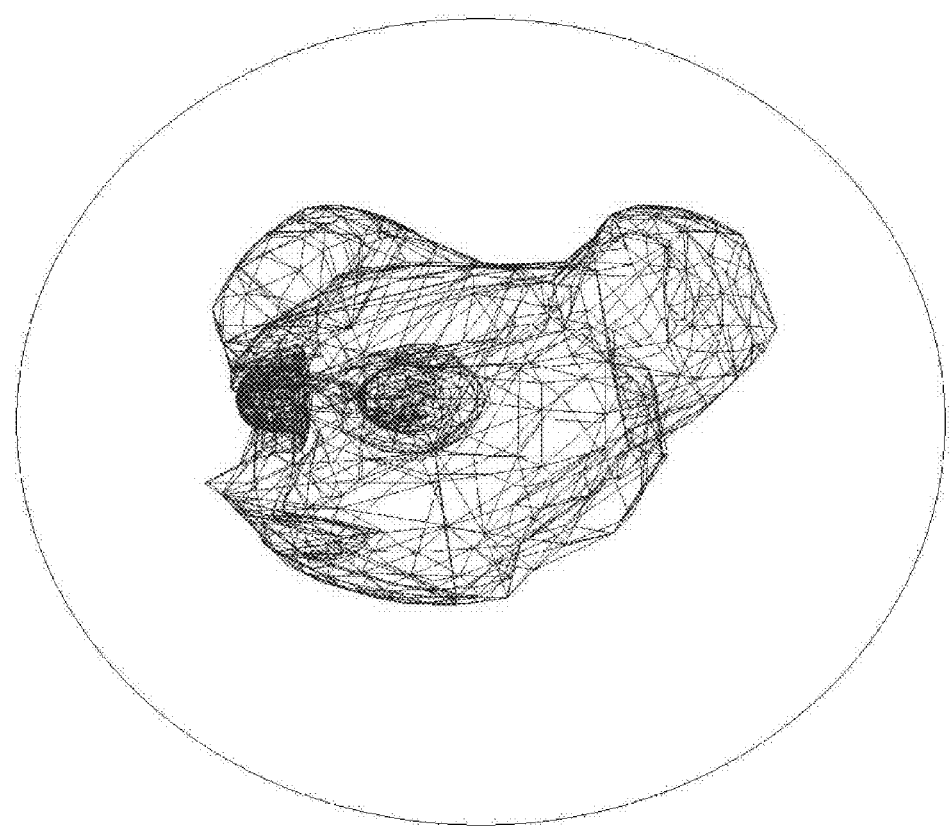
FIG. 6E illustrates a stage of an automatically-computed metamorphosis between two polyhedral models, using patches on the model shown in FIG. 5A.
Figure 7A:
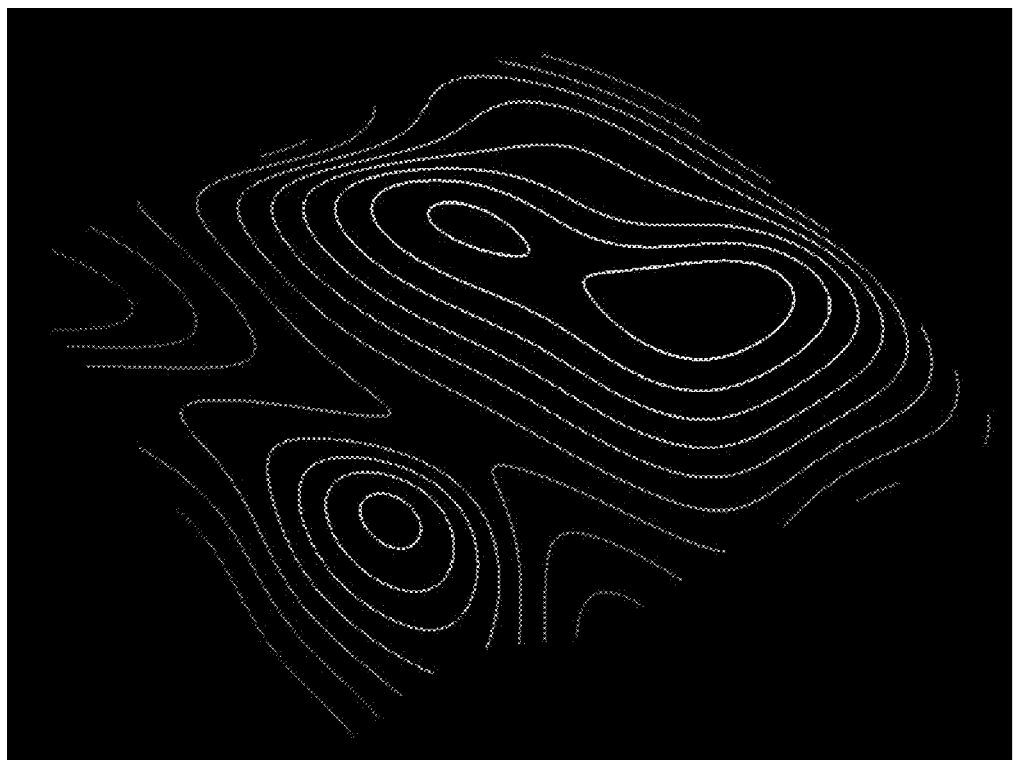
FIG. 7A illustrates a feature map for a functionally defined surface.
Figure 7B:
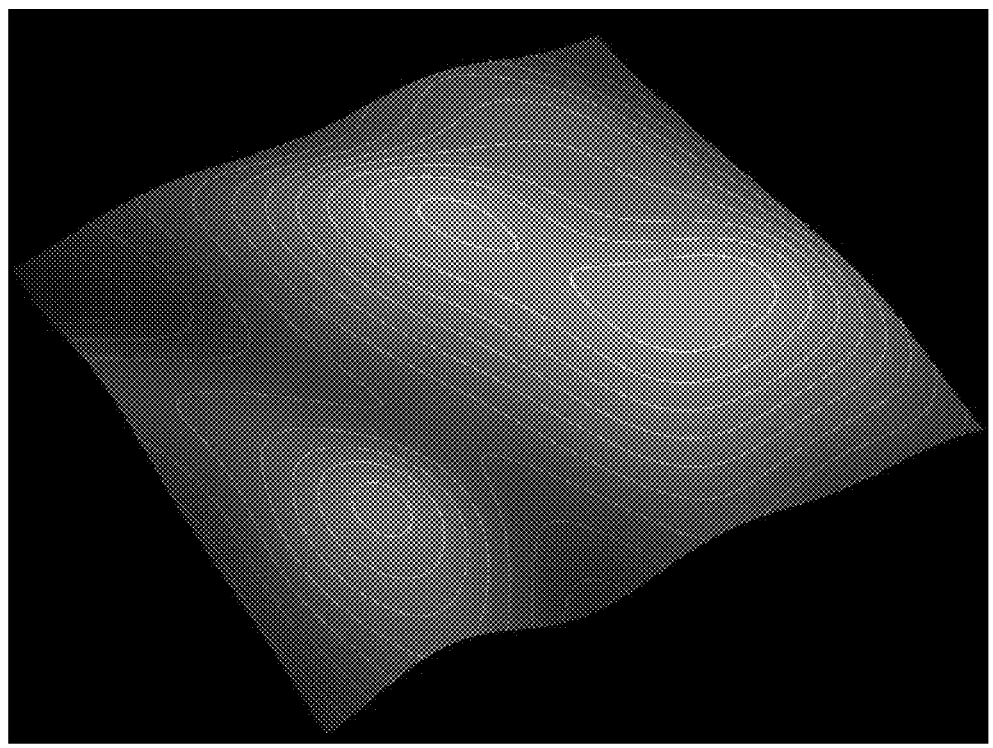
FIG. 7B illustrates a contour map to be compared to the feature map of FIG. 7A.
Figure 7C:
FIG. 7C illustrates a feature map for a functionally defined surface.
Figure 7D:
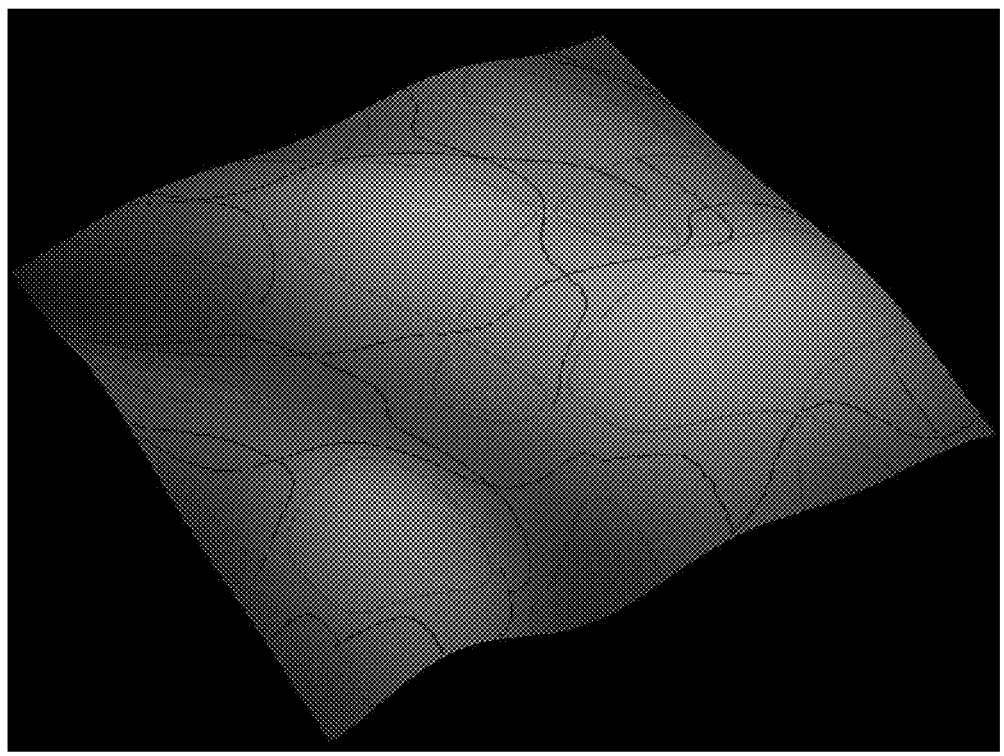
FIG. 7D illustrates a contour map to be compared with the feature map of FIG. 7C.

In a second exemplary embodiment, point features are used in a method of analyzing natural shapes, where a facial recognition algorithm is implemented which operates as follows:

Input a height field mesh of a face, such as would be computed by a range finder;

(1) Identify convex, concave, and hyperbolic regions of the mesh and locate the parabolic curves that separate these regions;

(2) Compute properties for each of the convex and concave regions: area (a), perimeter (p), compactness $$\left(\frac{4\pi \cdot a}{p^2}\right),$$

average radius, minimum dot product between two normals, mean maximum ($\kappa_{max}$) and minimum ($\kappa_{min}$) curvature, deviation from flatness ($\kappa^2_{max}+\kappa^2_{min}$), and number of ridges;

(3) Construct an association graph for two face meshes to be compared:

(a) Build an attribute graph for each mesh. Each convex or concave region leads to a node; the properties above are the attributes for that node;

(b) Edges between the nodes are created if and only if the shortest path along the mesh between those two nodes does not cross through another convex or concave region; FIG. 4 illustrates an example graph displayed over a face mesh;

(c) Create a node in the association graph for each member of the Cartesian product of the nodes in the two attribute graphs. That is, if the first graph has nodes A and B and the second graph has nodes u and v, then nodes Au, Av, Bu, and Bv are created;

(d) Create an edge in the association graph if there are edges connecting the antecedent nodes in both attribute graphs. That is, create an edge between Au and Bv if and only if the attribute graphs have (respectively) edges (A,B) and (u,v); and (4) Find the size of the largest clique (fully-connected subset of nodes) in the association graph.

FIG. 4 illustrates an association graph over a face mesh, which shows convex regions, such as the chin and nose; concave regions, such as the eyes; and circles indicate the nodes of the attribute graph, where several lines and curves indicate edges.

In the second exemplary embodiment, initial tests indicated that the above algorithm is 90% reliable in recognizing noisy versions of polyhedral meshes of closed objects, but suffered when trying to recognize morphed versions of face meshes.

Figure 12A:
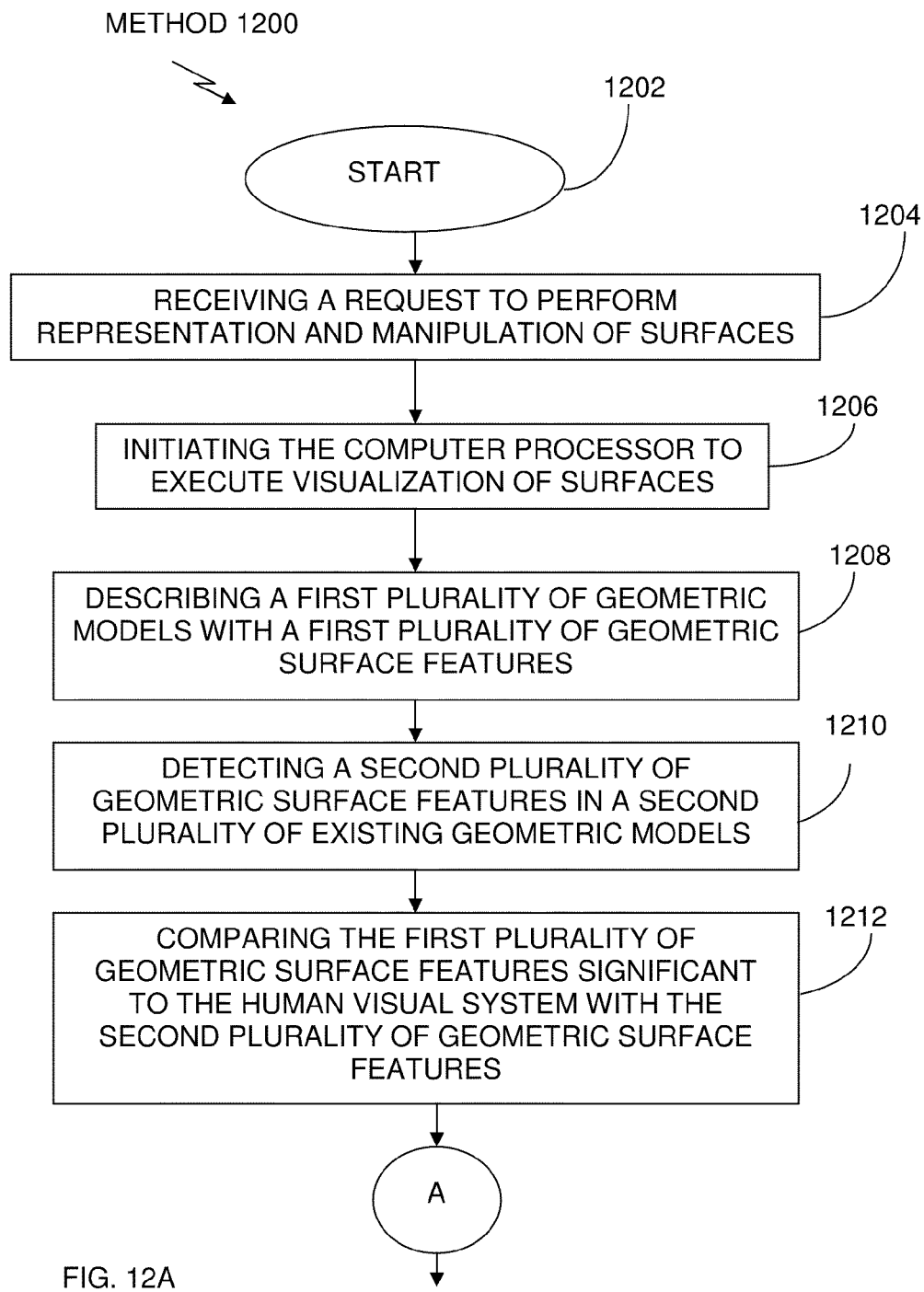
FIG. 12A illustrates a method 1200, which is another embodiment of visualization of surfaces.

Referring to FIG. 12A, and FIG. 11, in accordance with a second exemplary embodiment, at an operation start 1202 (hereafter "the operation 1202"), the system 1100 receives a signal from an operator or an individual user via either the input device 1152 or an automatic programmatic wake up signal from the computer processor 1106 which activates and initiates the computer executable program code implementing the method 1200. The method 1200, upon activation, performs other operations from selection signals received in the computer processor 1106 from the input device 1152, causing the method 1200 to be executed by the computer processor 1106 and in turn causing the computer processor 1106 to perform operations and procedures including calling algorithms and software applications and executing the instructions in the algorithms and applications to perform operations and sub operations of the method 1200 of providing various solutions to graphics visualizations requirements, including comparing face models for recognition.

Referring again to FIG. 12A and FIG. 11, in accordance with the second exemplary embodiment, at an operation receiving request to perform representation and manipulation of surfaces 1204 (hereafter "the operation 1204"), the program code of the method 1200 executed by the computer processor 1106 of the system 1100 causes the computer processor 1106 to receive an initiation request, such as a request made by the user requesting representation and manipulation of surfaces operations.

Referring to FIG. 12A, and FIG. 11, in accordance with the second exemplary embodiment, at an operation initiating the computer processor to execute visualization of surfaces 1206 (hereafter "the operation 1206"), in response to the user's request for representation and manipulation of surfaces operations to be conducted, the program code of the method 1200 executed by the computer processor 1106, causes the computer processor 1106 to automatically initiate the system 1100 to perform visualization of surfaces operations, including comparison of face models for recognition, according to exemplary embodiments. Thus, the computer processor 1106 initializes graphics algorithms along with instructions for performing visualization of surfaces task.

Referring to FIG. 12A and FIG. 11, in accordance with the second exemplary embodiment, at an operation describing a first plurality of geometric models with a first plurality of geometric surface features 1208 (hereafter "the operation 1208"), the program code of the method 1200 executed by the computer processor 1106, causes the computer processor 1106 to describe geometric models with a first group and/or plurality of geometric surface features significant to a human visual system.

Referring to FIG. 12A and FIG. 11, in accordance with the second exemplary embodiment, at an operation detecting a second plurality of geometric surfaces features in a second plurality of existing geometric models 1210 (hereafter "the operation 1210"), the program code of the method 1200 executed by the computer processor 1106, causes the computer processor 1106 to automatically detect a second group and/or set of geometric surface features in a second group of existing geometric models comparable to the first set of geometric surface features. The first group of geometric surface features includes psychophysics geometric surface features.

Referring to FIG. 12A and FIG. 11, in accordance with the second exemplary embodiment, at an operation comparing the first plurality of geometric surface features significant to the human visual system with the second plurality of geometric surface features 1212 (hereafter "the operation 1212"), the program code of the method 1200 executed by the computer processor 1106, causes the computer processor 1106 to compare the first group of geometric surface features, which are significant to the human visual system, with the second group of geometric surface features, where comparing includes analyzing perceptual geometric features by considering the group of psychophysics feature models favoring the human visual system.

Figure 12B:
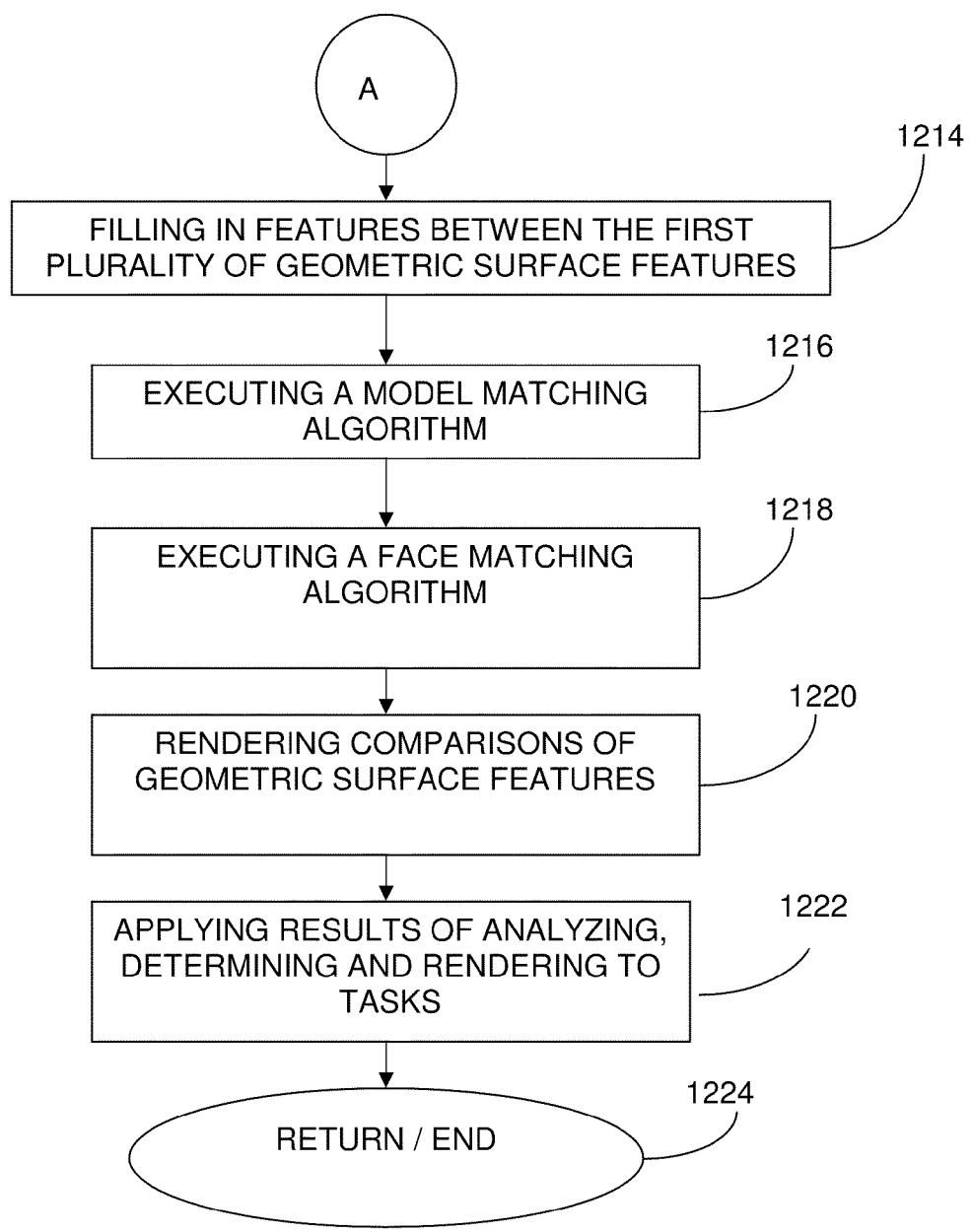
FIG. 12B illustrates a continuation of the method 1200.

Referring to FIG. 12A, FIG. 12B and FIG. 11, in accordance with the second exemplary embodiment, at an operation fill in features between the first plurality of geometric surface features and the second plurality of geometric features 1214 (hereafter "the operation 1214"), the program code of the method 1200 executed by the computer processor 1106, causes the computer processor 1106 to automatically fill in features between the first group of geometric surface features and the second group of geometric features and determine shape transformation, determine shape matching, erosion modeling and morphing, using a model matching algorithm to create either a partial model or create a full and/or entire model of new features.

Referring to FIG. 12A, FIG. 12B and FIG. 11, in accordance with the second exemplary embodiment, at an operation executing a model matching algorithm 1216 (hereafter "the operation 1216"), the program code of the method 1200 executed by the computer processor 1106, causes the computer processor 1106 to automatically execute the model matching algorithm, for geometric surface features, where the model matching algorithm to create either a partial model or create a full and/or entire model of new surface features. The model matching algorithm can be a face matching algorithm or a terrain matching algorithm. In exemplary embodiments, the fundamental geometric property used to locate features is the surface curvature, which measures the change in the surface normal. Thus, the preliminary operation required for the matching algorithms is the computation of the surface normal. With this vector available, a number of perceptually significant geometric features are computed.

Referring to FIG. 12A, FIG. 12B and FIG. 11, in accordance with the second exemplary embodiment, at an operation executing a face matching algorithm 1218 (hereafter "the operation 1218"), the program code of the method 1200 executed by the computer processor 1106, causes the computer processor 1106 to automatically execute the face matching algorithm, for geometric surface features, where the model matching algorithm to create either a partial model or create a full and/or entire model of new surface features. In exemplary embodiments, the fundamental geometric property used to locate features is the surface curvature, which measures the change in the surface normal. Thus, the preliminary operation required for the matching algorithms is the computation of the surface normal. With this vector available, a number of perceptually significant geometric features are computed.

In accordance with the second exemplary embodiment, the facial recognition algorithm is implemented as follows: Input a height field mesh of a face, such as would be computed by a range finder; (1) Identify convex, concave, and hyperbolic regions of the mesh and locate the parabolic curves that separate these regions; (2) Compute properties for each of the convex and concave regions: area (a), perimeter (p), compactness $$\left(\frac{4\pi \cdot a}{p^2}\right),$$

average radius, minimum dot product between two normals, mean maximum ($\kappa_{max}$) and minimum ($\kappa_{min}$) curvature, deviation from flatness ($\kappa^2_{max}+\kappa^2_{min}$), and number of ridges; (3) Construct an association graph for two face meshes to be compared: (a) Build an attribute graph for each mesh. Each convex or concave region leads to a node; the properties above are the attributes for that node; (b) Edges between the nodes are created if and only if the shortest path along the mesh between those two nodes does not cross through another convex or concave region; FIG. 4 illustrates an example graph displayed over a face mesh; (c) Create a node in the association graph for each member of the Cartesian product of the nodes in the two attribute graphs. That is, if the first graph has nodes A and B and the second graph has nodes u and v, then nodes Au, Av, Bu, and Bv are created; (d) Create an edge in the association graph if there are edges connecting the antecedent nodes in both attribute graphs. That is, create an edge between Au and Bv if and only if the attribute graphs have (respectively) edges (A,B) and (u,v); and (4) Find the size of the largest clique (fully-connected subset of nodes) in the association graph.

Referring to FIG. 12A, FIG. 12B and FIG. 11, in accordance with the second exemplary embodiment, at an operation rendering comparisons of geometric surface features 1220 (hereafter "the operation 1220"), the program code of the method 1200 executed by the computer processor 1106, and executing the model matching algorithm, causes the computer processor 1106 to automatically render comparisons of geometric facial features of the plurality of existing psychophysics feature models and perceptual geometric features and either the partial model and/or the entire model of new features.

Referring to FIG. 12A, FIG. 12B and FIG. 1, in accordance with the second exemplary embodiment, at an operation applying results of analyzing determining and rendering to tasks 1222 (hereafter "the operation 1222"), the program code of the method 1200 executed by the computer processor 1106, causes the computer processor 1106 to automatically apply the results of analyzing, determining and rendering of facial feature models to tasks in which shapes or spatial relations must be analyzed, recognized and understood.

Referring to FIG. 12A, FIG. 12B and FIG. 1, in accordance with the second exemplary embodiment, at an operation return and/or end 1224 (hereafter "the operation 1224"), the program code of the method 1200 executed by the computer processor 1106, causes the computer processor 1106 to automatically either return to any operation 1204 through operation 1222 and continue such operation until the visualizations task is complete or until the computer processor 1106 receives a signal to end, thus causing the operations to end.

Figure 15D:
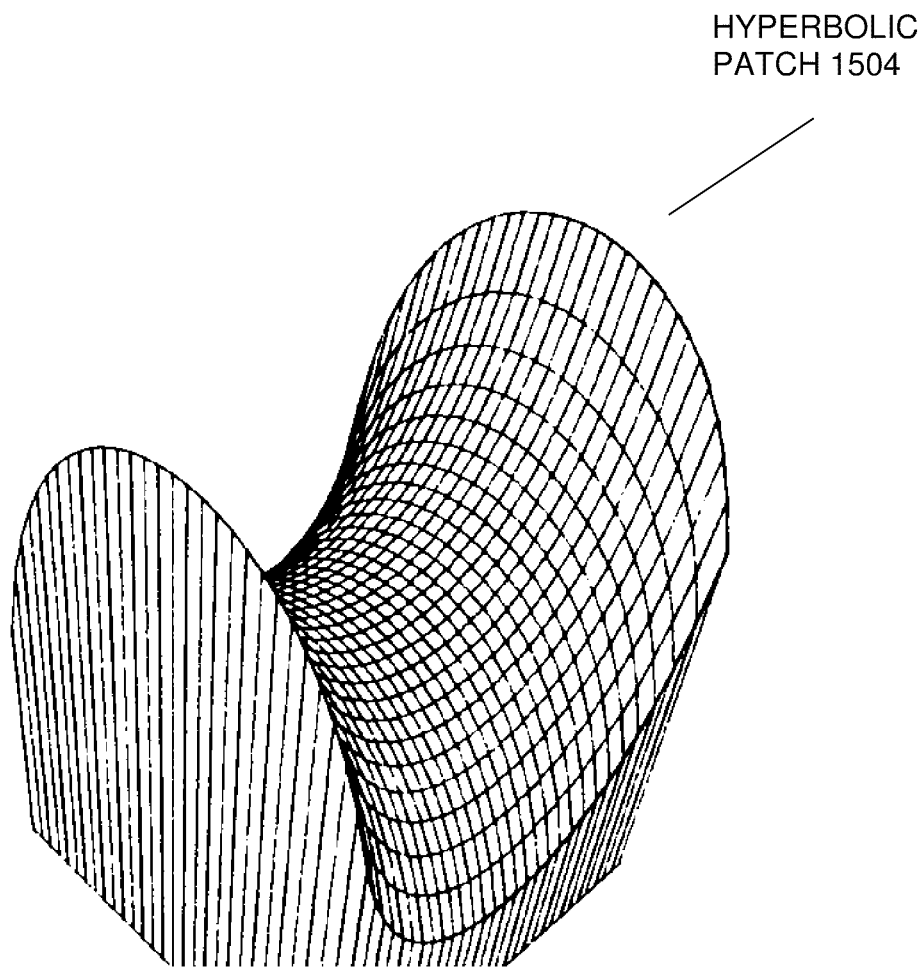
FIG. 15D illustrates a hyperbolic patch feature definition.

In a first species of the exemplary embodiments, another application of the features is demonstrated by the decomposition of a surface into patches (including hyperbolic patches) (FIG. 15D, illustrates a hyperbolic patch feature definition). This can facilitate an automated surface comparison. This method is used to break two polyhedral meshes into surface patches (of which one is shown in FIG. 5A, FIG. 5B, FIG. 5C, FIG. 5D, FIG. 5E, and FIG. 5F). Using a similar technique to the attributed graph described above, in the second exemplary embodiment, patches are automatically selected to be mapped into each other for a metamorphic change from one object into another (see FIG. 6A, FIG. 6B, FIG. 6C, FIG. 6D and FIG. 6E).

One comparison of interest, for terrain in particular and surfaces in general, is with the use of contour lines. This is a standard technique used on maps to represent terrain. Two important computational metrics for identification of both the features discussed above and for contours are the number of points identified and the time required to identify them. Table 1 shows statistics for several of the test probability surfaces from the multi-surface visualization application described above. In Table 1. the number of features and time required to identify them for various test surfaces are identified. Further, it can be seen in Table 1, that the number of points used to build the curve features is comparable to the number of points on level set contours, and the time required for the curve processing is quite small.

tional surfaces in exemplary embodiments. Thus, in exemplary embodiments, sampling time can be radically reduced by harnessing the parallel nature of (for example) the graphics hardware.

Further, it can be seen in Table 1, that the number of points identified as part of the various curves is comparable in most surfaces with the number of points identified as being part of contour lines. This gives us confidence that the features identified in this work will lead to a representation comparable in its storage requirements with contour lines. The time to extract features is quite small; again, neither the implementation for following the feature curves or following contours is particularly clever. Both use ideas in Marching Cubes and similar isosurface extraction techniques to trace the desired feature. The times for finding the new features would appear to be quite small relative to the number of points identified, however.

Another important statistical question is the asymptotic behavior of the computations. Table 2. shows measurements of the growth rate in number of points identified and time required to build the feature curves as well as a contour map. Both grow at linear rates, even though there is a disparity for this particular surface in the number of points for the perceptual features versus the number of points for the contour maps.

TABLE 2

| Surface | Sampling Time | Parabolic Size | Curves Time | Ridges/ValleysSize | Ridges/ValleysTime | Total Size | Features Time | Contour Size | Curve Time |
|---|---|---|---|---|---|---|---|---|---|
| 10000 | 5.322 | 1599 | 0.040 | 1200 | 0.014 | 2799 | 5.376 | 1523 | 0.160 |
| 20000 | 10.624 | 2299 | 0.081 | 1733 | 0.029 | 4032 | 10.734 | 2158 | 0.316 |
| 30000 | 15.912 | 2870 | 0.123 | 2172 | 0.047 | 5042 | 16.082 | 2649 | 0.479 |
| 50000 | 26.459 | 3619 | 0.197 | 2764 | 0.086 | 6383 | 26.742 | 3389 | 0.795 |
| 100000 | 53.225 | 5142 | 0.397 | 3953 | 0.154 | 9095 | 53.776 | 4775 | 1.586 |

As may be seen in Table 2, the time for the sampling and curve processing are both linear in the number of samples. This is as expected; there is a constant amount of work per sample in the mesh. The number of surface features identified grows at a linear rate as well. The surface used for these data was intentionally chosen to be one for which the number of surface points was notably higher than the number of contour points. It appears to grow at the same rate, however.

Another important comparison is the visual representation. FIG. 7A, FIG. 7B, FIG. 7C, and FIG. 7D show terrain feature maps (i.e., FIG. 7A and FIG. 7C) with their corresponding contour maps (i.e., FIG. 7B and FIG. 7D, respectively) with

TABLE 1

| Surface | Sampling Time | Parabolic Size | Curves Time | Ridges/ValleysSize | Ridges/ValleysTime | Total Size | Features Time | Contour Size | Curve Time |
|---|---|---|---|---|---|---|---|---|---|
| 1 | 15.107 | 4700 | 0.331 | 2784 | 0.081 | 7484 | 15.519 | 8169 | 4.372 |
| 2 | 15.053 | 4789 | 0.348 | 2770 | 0.079 | 7559 | 15.480 | 7729 | 3.933 |
| 3 | 29.237 | 4174 | 0.261 | 2810 | 0.080 | 6983 | 29.579 | 5903 | 2.347 |
| 4 | 17.655 | 5167 | 0.391 | 3890 | 0.148 | 9057 | 18.194 | 6565 | 2.766 |
| 5 | 26.468 | 3518 | 0.184 | 2595 | 0.072 | 6113 | 26.724 | 6887 | 3.197 |
| 6 | 26.945 | 3909 | 0.231 | 2892 | 0.086 | 6801 | 27.262 | 6821 | 3.026 |

Further, it can be seen from TABLE 1, that the bulk of the time required to locate the features is taken in sampling basic properties, including principal directions, asymptotic directions, and the various curvatures (principal, mean, Gaussian). In exemplary embodiments, computers manipulate these values in a brute-force raster scan of the surface. Fortunately, these operations are completely parallelizable for the funceach feature map drawn on top of the associated field and in isolation for the respective contour map. The sense of the surface is quite similar. The major difference is that the ridges tend to give an explicit location for the local peaks in the surface. The contour map shows steeper areas by the spacing between the contours. In the perceptual feature representation, the steepness is indicated by the curvature of the ridges that run up the hill. Thus the steepness is visualized in the direction of the feature. The base of a hill is explicitly represented by the parabolic curves, where this must be inferred by the contours that happen to bend. It takes either some skill or some luck to pick the right isovalues as the height of a particular contour to have such a feature directly visible in the contour map.

In a second species of the exemplary embodiments, effects of rendered representations are extended. One extended effect involves reducing the size of the representation by investigating the efficiency of various interpolating or approximating curves for the feature curves. This is then compared against a similar representation for contours. It should be noted that by their nature, contours effectively require only ⅔ of the storage per point in their specification, since the height may be stored once for the whole curve. But the various feature points, are not used in the visualizations, offer a set of points which are of special interest on the various feature curves.

As noted above, a species of the exemplary embodiments of a parallel implementation would greatly improve the performance of locating the features.

In addition, in a third species of the exemplary embodiments for reducing the storage requirements that would facilitate finding a minimal amount of storage required for the salient features of a surface are found in the graph representations demonstrated for the face recognition tasks.

Exemplary embodiments harness the power of perceptual features as a direct cue in visualizing surfaces. Exemplary embodiments demonstrate that such features are effective in conveying the shape of a surface, as well as being effective in allowing other items to be visualized. Exemplary embodiments are built upon previous representations and expand the use of perceptual features to provide a more complete visual and geometric representation of a surface for which no a priori shape cues (such as the surface of human anatomy) are available. Thus, exemplary embodiments provide visual representation that captures perceptually important features for smoothly varying shapes.

Features of the exemplary embodiments are presented in the following tables:

TABLE 3

Method for Determining Surface Feature Locations
All algorithms by Mark A. Livingston with assistance as noted,
  except for computation of basic properties from existing algorithms.
Find basic properties (existing algorithms or mathematical definitions)
For each vertex in mesh
  Estimate normal. Existing algorithms are used in current
    implementation (Normal Vector Vote, Averaging of normals from
    adjacent or nearby faces) or may be part of input mesh.
  Estimate principal directions and principal curvatures from normals.
    Existing algorithms by Taubin (1995) or Goldfeather and Interrante
    (2004) are used in current implementation. Compute Gaussian and
    mean curvature from estimated principal curvatures.
  Classify vertex as convex, concave, or hyperbolic.
  If vertex is hyperbolic (negative Gaussian curvature), estimate
    asymptotic directions and curvatures in those directions. The
    algorithms by Taubin or Goldfeather and Interrante are used in the
    current implementation.

TABLE 4

Find parabolic curves (novel, with Justin Solomon
For each hyperbolic vertex in mesh
  For each adjacent vertex (connected by an edge in the input mesh)
    that is not hyperbolic, estimate the zero-crossing of the Gaussian
    curvature and label this point along the edge as a parabolic point.
Connect adjacent parabolic points into closed parabolic curves.
  Closure is guaranteed by associating the parabolic points with a
  particular hyperbolic region.

TABLE 5

Find ridges
For each vertex in the mesh
  Compare the curvature with adjacent vertices.
  If the curvature is greater than at adjacent vertices in both
    negative and positive directions along a single vector, label the
    vertex as a ridge point for that direction.
Connect adjacent ridge points with directions that are within a
    tolerance $t_1$ of being parallel into a locus of points labeled as a
    ridge.
If ridges curve more than a threshold c, are too long or too
  short, or too many or too few in number, adjust tolerance $t_1$ and re-run
  the previous two steps until an appropriate number are identified for the
  model.
  ** Here and other places, calls to repeat some number of previous steps
      imply steps at the same level in the pseudocode.

TABLE 6

Face recognition algorithm (novel) Mark A. Livingston and Justin
Solomon
Identify geometric features, with the algorithm above, for each of two
  models to be compared.
Build an attribute graph for each model, consisting of the following
  steps:
  Create a node for each convex and each concave region.
  Create an edge between two nodes if an only if the shortest path
    along the surface between any point in one region and any point in
    the other region does not cross a third region. Dijkstra's
    algorithm or the Floyd-Warshall algorithm for shortest paths may
    be used across the mesh (interpreting each vertex as a node) in
    order to find shortest paths across the surface, or geodesic curves
    across the surface may be computed by a variety of known
    algorithms.
  Give attributes to each node that indicate the geometric features
    contained within the region. These features may include any subset
    (including the entire set) of features computed with the above
    algorithm and any other features based on curvature metrics of the
    surface.
  Give attributes to each node that indicate other geometric
    properties of the region, such as area, perimeter, radius, diameter,
    compactness, or summary statistics of the curvature or any of the
    attributes listed here.

TABLE 7

Build the association graph for the two graphs built in the previous step, consisting of the following steps (based on existing work in computer vision and other fields):
  Create a node in the new graph for each pair of nodes in the two previous graphs whose attributes are within a set of tolerances $\{t_1, ..., t_n\}$ for each attribute. These tolerances may be
        adjusted for scale of the input meshes, based on the diameter of the mesh (as measured by a bounding volume) or any other standard measure of scale.
  Create an edge between two nodes in the new graph if the corresponding two nodes in the first previous graph are connected and the corresponding two nodes in the second previous graph are connected.
Find the maximal clique within the association graph - that is, the largest subset of fully-connected nodes in the association graph. This may be done with a number of heuristic algorithms available in the literature.
If the size of the maximal clique relative to the size of the association graph is above a tolerance T, output the two meshes as potential matches.
Repeat the above steps for any two models that are to be compared.
  Constructed attribute graphs may be saved for future comparisons.
  Recognition of a new face as being within a database of faces (which may have their attribute graphs pre-computed with appropriate tolerances) may be declared to be the best match (greatest value above the tolerance T), or potential (for a later algorithm or human reviewer to arbitrate among many such possible matches).

TABLE 8

Shape matching algorithm (novel)
Algorithms by Mark A. Livingston
Identify geometric features, with the algorithm above, for each of two models to be compared.
Build an attribute graph for each model, as for face recognition.
Find the best match between any feature from the first model with any feature from the second model over all possible pairs. Use this to fix two degrees of freedom of the orientation of the second model with respect to the first.
Find a feature on the first that matches most closely with one on the second under the constraint of orientation defined above. Use this matching to fix the third and final degree of freedom of orientation of the second model with respect to the first.
Traverse the lists of features of each model, mapping features with similar attributes (to within a threshold, settable by the user) to each other. The following principles may be applied iteratively.

TABLE 9

Two features on one model may be mapped to the same feature on the other model if the attributes are similar and the areas can be mapped with small enough stretching or bending of the shapes.
Unmapped features on either model may be mapped to an area on the "background" portion (i.e. the surface feature that dominates the shape) on the other model.
Split the models into patches.
  Feature areas become patches.
  Split the "background" into patches that have no holes.
    Shortest (geodesic) paths between existing patches may be computed by searching for the shortest positive distance between any two patches. This path then creates a boundary.
    Once several such boundaries are created, an enclosed area becomes a patch and its distance to neighboring patches becomes zero (since they share an edge).
The mapping of patches may then be fed into an existing algorithm that can compute the mapping of individual facets from one model to the other model.

TABLE 10

Geometric Representation, Measurement, and Visualization (novel)
Algorithms by Mark A. Livingston, partly implemented (for terrain)
This algorithm applies to a wide variety of natural shapes, from terrain to anatomic structures. It also applies to any surface that consists of smooth surfaces (defined mathematically by continuity of derivatives of some order).
Derivation of Model from Existing Source
Identify geometric features, with the algorithm above.
Build graph structure, including hierarchical or non-hierarchical configurations, to represent spatial relationships between geometric features. These may include extensions of the attribute graphs described for faces, or tree-like structures that describe the inclusion of features within the volume affected by another feature. For the latter, any number of existing algorithms for computing bounding volume hierarchies may be applied.
Measures of volume, elevation, slope, and other geometric properties may be computed.
  Volume measurements may be computed from the bounding hierarchies if he structure is hierarchical.
  Volumes may be computed via summation of volumes in a graph, wherein each node has a volume computed via an analysis of the internal region from a variety of methods, including volume element (voxel) counting and other numerical integration strategies or analytic methods that approximate the facets of a model with parametric approximations from which analytical volume measurements are obvious.

TABLE 11

Measurements of slope may be computed from curvatures stored in each node along with orientation information for the model (at any scale).
Elevation changes may be computed from measurements of slope and lengths stored with each node.
Visualization of the model may be performed by drawing 3D representations of any or all of the geometric features with standard techniques in the literature. To these, any number of rendering options may be added, including but not limited to wire-frame outlines or filled representations, hidden surface removal, lighting, texture, anti-aliasing, depth of field, stipple (dashed or dotted lines or surfaces).

TABLE 12

Generation of Model from Scratch
A user interface (2D or 3D) may allow the user to directly specify geometric features with any number of standard interaction techniques.
Gather together the features with the techniques described above into attribute graphs or hierarchical graphs.
Smooth interpolation, subject to derivative constraints implied by the features, is used to fill in the surface between features.

While the exemplary embodiments have been particularly shown and described with reference to preferred embodiments thereof, it will be understood by those skilled in the art that the preferred embodiments including the first exemplary embodiment and the second exemplary embodiment have been presented by way of example only, and not limitation; furthermore, various changes in form and details can be made therein without departing from the spirit and scope of the invention. Thus, the breadth and scope of the present exemplary embodiments should not be limited by any of the above described preferred exemplary embodiments, but should be defined only in accordance with the following claims and their equivalents. Any and/or all references cited herein, including issued U.S. patents, or any other references, are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

What is claimed is:

1. A method of representation and manipulation of surfaces with perceptual geometric features using a computer processor, the method comprising:
receiving a request to perform operations of representation and manipulation of surfaces;
initiating the computer processor to execute visualization of surfaces computer readable and computer executable program code;
describing a first plurality of geometric models with a first plurality of geometric surface features significant to a human visual system;
detecting a second plurality of geometric surface features on a second plurality of existing geometric models which are comparable to the first plurality of geometric surface features significant to the human visual system described in the first plurality of geometric models, wherein the first plurality of geometric surface features significant to the human visual system are psychophysics geometric surface features, wherein detecting the second plurality of geometric surface features includes calling and executing, by the computer processor, algorithms from a group of algorithms consisting of image based feature detection algorithms and event detection algorithms and surface properties measurement algorithms which identify detected feature points together with identifying detected curves, concerning detecting a group of image based features, and wherein event detection includes detecting events which identify parabolic curves identifying lips and beaks, by identifying changes in silhouette, identifying changes in self occlusion and identifying changes in self shadows, representing, to the human visual system, varying perceptually significant geometric surface features;
comparing the first plurality of geometric surface features significant to the human visual system with the second plurality of geometric surface features, wherein comparing includes analyzing perceptual geometric features by considering the plurality of psychophysics feature models favoring the human visual system;
filling in features, between the first plurality of geometric surface features and the second plurality of geometric features, using a model matching algorithm to create one of a partial model and an entire model of new features, wherein the model matching algorithm performs operations selected from a group of operations consisting of an operation of determining a change in surface normal vectors, wherein surface normal vectors are integral to creating a plurality of perceptually geometric features, and a rule based operation of filling missing features between the first plurality of geometric surfaces features and the second plurality of geometric features of existing geometric models, thereby connecting features together, based on feature rules of the rule based operation and hierarchical descriptions determining dominant features, absent standard model descriptions;
rendering, by the computer processor using the model matching algorithm, comparisons of geometric surface features of the plurality of existing psychophysics feature models and perceptual geometric features and one of the partial model and the entire model of new features; and
applying results of a plurality of analyzing, determining and rendering operations, to tasks in which one of shapes and spatial relations require the plurality of analyzing and determining operations, in processes of recognizing and understanding, in terms of the human visual system, one of face visualization models and terrain visualization models.

2. The method of claim 1, wherein filling in features includes: determining shape transformation, erosion modeling and morphing, shape matching, by using the model matching algorithm to perform operations including:
computing a surface normal;
considering a plurality of vertices, edges and surfaces in a mesh;
defining a representation on one of a regular grid and an irregular grid;

determining a normal of each surface which is a collection of a plurality of triangles;
defining a distance of a vertex for each triangle of the plurality of triangles;
defining a height field of a function normal;
deriving a set of feature curves and a set of feature points;
determining an infinitesimal movement along representations of surfaces;
deriving properties of representations of continuous surfaces;
determining zero crossings in curvatures, when representations of surfaces change between one of convex-hyperbolic and concave-hyperbolic;
determining parabolic curves by traversing the mesh until an edge is found, wherein a curvature is negative at a first endpoint and positive at a second endpoint;
determining a plurality of flecnodes;
determining ruffles;
determining gutterpoints;
locating biflecnodes;
determining a conical point; and
rendering visualization of surfaces with perceptual geometric features using a computer processor communicatively connected to a graphics output device resulting in determining shape transformation, erosion modeling and morphing, and shape matching, using the model matching algorithm.

3. The method of claim 1, wherein filling in features further includes: determining shape transformation, erosion modeling and morphing, shape matching, by using the model matching algorithm, wherein the model matching algorithm is a face matching algorithm.

4. The method of claim 3, wherein the face matching algorithm performs operations including:
inputting a height field mesh of a face;
identifying convex, concave and hyperbolic regions of the height field mesh of the face;
computing properties for convex, concave and hyperbolic regions;
constructing an association graph for two face meshes to be compared;
creating a node in the association graph for two face meshes for each member of a Cartesian product of nodes;
creating an edge, in the association graph for two face meshes, connecting antecedent nodes;
finding a size of fully connected antecedent nodes;
decomposing surfaces into patches; and
rendering three dimensional visualization of surfaces with perceptual geometric features using a computer processor communicatively connected to a graphics output device.

5. A system of providing representation and manipulation of surfaces with perceptual geometric features, the system comprising:
a computer processor communicatively coupled to an input output device; and
a memory, residing in the computer processor, having a dynamic repository and a program unit containing a computer readable and computer executable program, wherein the computer readable and computer executable program residing in the program unit, when executed by the computer processor causes the computer processor to perform operations of:
receiving a request to perform operations of visualization of surfaces;
initiating the computer processor to execute representation and manipulation of surfaces operations computer readable and computer executable program code;
describing a first plurality of geometric models with a first plurality of geometric surface features significant to a human visual system;
detecting a second plurality of geometric surface features on a second plurality of existing geometric models which are comparable to the first plurality of geometric surface features significant to the human visual system described in the first plurality of geometric models, wherein the first plurality of geometric surface features significant to the human visual system are psychophysics geometric surface features, wherein detecting the second plurality of geometric surface features includes calling and executing, by the computer processor, algorithms from a group of algorithms consisting of image based feature detection algorithms and event detection algorithms and surface properties measurement algorithms which identify detected feature points together with identifying detected curves, concerning detecting a group of image based features, and wherein event detection includes detecting events which identify parabolic curves identifying lips and beaks, by identifying changes in silhouette, identifying changes in self occlusion and identifying changes in self shadows, representing, to the human visual system, varying perceptually significant geometric surface features;
comparing the first plurality of geometric surface features significant to the human visual system with the second plurality of geometric surface features, wherein comparing includes analyzing perceptual geometric features by considering the plurality of psychophysics feature models favoring the human visual system;
filling in features, between the first plurality of geometric surface features and the second plurality of geometric features, using a model matching algorithm to create one of a partial model and an entire model of new features, wherein the model matching algorithm performs operations selected from a group of operations consisting of an operation of determining a change in surface normal vectors, wherein surface normal vectors are integral to creating a plurality of perceptually geometric features, and a rule based operation of filling missing features between the first plurality of geometric surfaces features and the second plurality of geometric features of existing geometric models, thereby connecting features together, based on feature rules of the rule based operation and hierarchical descriptions determining dominant features, absent standard model descriptions;
rendering, by the computer processor using the model matching algorithm, comparisons of geometric surface features of the plurality of existing psychophysics feature models and perceptual geometric features and one of the partial model and the entire model of new features; and
applying results of a plurality of analyzing, determining and rendering operations, to tasks in which one of shapes and spatial relations require the plurality of analyzing and determining operations, in processes of recognizing and understanding, in terms of the human visual system, one of face visualization models and terrain visualization models.

6. The system of claim 5, wherein filling in features includes the computer processor executing the model matching algorithm to perform operations including: determining shape transformation, erosion modeling and morphing, shape matching.

7. The system of claim 6, wherein determining shape transformation erosion modeling and morphing, shape matching includes having the computer processor executing the model matching algorithm to perform operations including:
   computing a surface normal;
   considering a plurality of vertices, edges and surfaces in a mesh;
   defining a representation on one of a regular grid and an irregular grid;
   determining a normal of each surface which is a collection of a plurality of triangles;
   defining a distance of a vertex for each triangle of the plurality of triangles;
   defining a height field of a function normal;
   deriving a set of feature curves and a set of feature points;
   determining an infinitesimal movement along representations of surfaces;
   deriving properties of representations of continuous surfaces;
   determining zero crossings in curvatures, when representations of surfaces change between one of convex-hyperbolic and concave-hyperbolic;
   determining parabolic curves by traversing the mesh until an edge is found, wherein a curvature is negative at a first endpoint and positive at a second endpoint;
   determining a plurality of flecnodes;
   determining ruffles;
   determining gutterpoints;
   locating biflecnodes;
   determining a conical point; and
   rendering visualization of surfaces with perceptual geometric features using a computer processor communicatively connected to a graphics output device resulting in determining shape transformation, erosion modeling and morphing, and shape matching, using the model matching algorithm.

8. The system of claim 7, wherein the model matching algorithm is a face matching algorithm.

9. The system of claim 8, wherein the computer processor executing the face matching algorithm performs operations including:
   inputting a height field mesh of a face;
   identifying convex, concave and hyperbolic regions of the height field mesh of the face;
   computing properties for convex, concave and hyperbolic regions;
   constructing an association graph for two face meshes to be compared;
   creating a node in the association graph for two face meshes for each member of a Cartesian product of nodes;
   creating an edge, in the association graph for two face meshes, connecting antecedent nodes;
   finding a size of fully connected antecedent nodes;
   decomposing surfaces into patches; and
   rendering three dimensional visualization of surfaces with perceptual geometric features using a computer processor communicatively connected to a graphics output device.

10. A non-transitory computer readable medium having a plurality of computer readable and computer executable instructions of a method of representation and manipulation of surfaces with perceptual geometric features when executed on a computer processor, causes the computer processor to execute computer readable and computer executable instructions to perform operations of a method comprising:
   instructions initiating the computer processor to execute representation and manipulation of surfaces operations computer readable and computer executable program code, wherein the non-transitory computer readable medium includes a non-transitory computer readable data storage medium including storage devices, such as tape drives, disc drives and thumb drives;
   instructions describing a first plurality of geometric models with a first plurality of geometric surface features significant to a human visual system;
   instructions detecting a second plurality of geometric surface features on a second plurality of existing geometric models which are comparable to the first plurality of geometric surface features significant to the human visual system described in the first plurality of geometric models, wherein the first plurality of geometric surface features significant to the human visual system are psychophysics geometric surface features, wherein detecting the second plurality of geometric surface features includes calling and executing, by the computer processor, algorithms from a group of algorithms consisting of image based feature detection algorithms and event detection algorithms and surface properties measurement algorithms which identify detected feature points together with identifying detected curves, concerning detecting a group of image based features, and wherein event detection includes detecting events which identify parabolic curves identifying lips and beaks, by identifying changes in silhouette, identifying changes in self occlusion and identifying changes in self shadows, representing, to the human visual system, varying perceptually significant geometric surface features;
   instructions comparing the first plurality of geometric surface features significant to the human visual system with the second plurality of geometric surface features, wherein comparing includes analyzing perceptual geometric features by considering the plurality of psychophysics feature models favoring the human visual system;
   instructions filling in features, between the first plurality of geometric surface features and the second plurality of geometric features, using a model matching algorithm to create one of a partial model and an entire model of new features, wherein the model matching algorithm performs operations selected from a group of operations consisting of an operation of determining a change in surface normal vectors, wherein surface normal vectors are integral to creating a plurality of perceptually geometric features, and a rule based operation of filling missing features between the first plurality of geometric surfaces features and the second plurality of geometric features of existing geometric models, thereby connecting features together, based on feature rules of the rule based operation and hierarchical descriptions determining dominant features, absent standard model descriptions;
   instructions rendering, by the computer processor using the model matching algorithm, comparisons of geometric surface features of the plurality of existing psychophysics feature models and perceptual geometric features and one of the partial model and the entire model of new features; and
   instructions applying results of from a plurality of analyzing, determining and rendering operations, to tasks in which one of shapes and spatial relations require the plurality of analyzing and determining and rendering operations, in processes of recognizing and understanding, in terms of the human visual system, one of face visualization models and terrain visualization models.

11. The non-transitory computer readable medium of claim 10, wherein instructions filling in features using the model matching algorithm includes: instructions determining shape transformation, erosion modeling and morphing, shape matching.

12. The non-transitory computer readable medium of claim 11, wherein instructions of the model matching algorithm which include instructions determining shape transformation, erosion modeling and morphing, shape matching further have instructions including:
  instructions computing a surface normal;
  instructions considering a plurality of vertices, edges and surfaces in a mesh;
  instructions defining a representation on one of a regular grid and an irregular grid;
  instructions determining a normal of each surface which is a collection of a plurality of triangles;
  instructions defining a distance of a vertex for each triangle of the plurality of triangles;
  instructions defining a height field of a function normal, characterized as $$N = \frac{1}{\sqrt{1+f_u^2+f_v^2}}[-f_u - f_v 1]^T;$$

Where,
  N=normal;
  $f_u$=a first tangent vector;
  $f_v$=a second tangent vector; and
  T=the tangent along the curve, and
  where $[-f_u - f_v 1]^T$ represents a multi-component vector, including at least three components;
  instructions deriving a set of feature curves and a set of feature points;
  instructions determining an infinitesimal movement along representations of surfaces;
  instructions deriving properties of representations of continuous surfaces;
  instructions determining zero crossings in curvatures, when representations of surfaces change between one of convex-hyperbolic and concave-hyperbolic;
  instructions determining parabolic curves by traversing the mesh until an edge is found, wherein a curvature is negative at a first endpoint and positive at a second endpoint;
  instructions determining a plurality of flecnodes;
  instructions determining ruffles;
  instructions determining gutterpoints;
  instructions locating biflecnodes;
  instructions determining a conical point; and
  instructions rendering visualization of surfaces with perceptual geometric features using a computer processor communicatively connected to a graphics output device resulting in determining shape transformation, erosion modeling and morphing, and shape matching, using the model matching algorithm, wherein the non-transitory computer readable medium includes a non-transitory computer readable data storage medium including storage devices, such as tape drives, disc drives and thumb drives.

13. The non-transitory computer readable medium of claim 12, wherein the model matching algorithm is a face matching algorithm further having a plurality of face matching algorithm instructions.

14. The non-transitory computer readable medium of claim 13, wherein the plurality of face matching algorithm instructions include:
  instructions of inputting a height field mesh of a face;
  instructions identifying convex, concave and hyperbolic regions of the height field mesh of the face;
  instructions for computing properties for convex, concave and hyperbolic regions;
  instructions of constructing an association graph for two face meshes to be compared;
  instructions for creating a node in the association graph for two face meshes for each member of a Cartesian product of nodes;
  instructions for creating an edge, in the association graph for two face meshes, connecting antecedent nodes;
  instructions for finding a size of fully connected antecedent nodes;
  instructions decomposing surfaces into patches; and
  instructions rendering three dimensional visualization of surfaces with perceptual geometric features using a computer processor communicatively connected to a graphics output device, wherein the non-transitory computer readable medium includes a non-transitory computer readable data storage medium including storage devices, such as tape drives, disc drives and thumb drives.

* * * * *